(12) United States Patent
Selvanesan et al.

(10) Patent No.: US 12,727,007 B2
(45) Date of Patent: Sep. 1, 2026

(54) NR SIDELINK MULTI-CONTROL/DATA MULTIPLEXING

(71) Applicant: Fraunhofer-Gesellschaft zur Förderung der angewandten Forschung e.V., Munich (DE)

(72) Inventors: Sarun Selvanesan, Berlin (DE); Baris Göktepe, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 394 days.

(21) Appl. No.: 18/194,225

(22) Filed: Mar. 31, 2023

(65) Prior Publication Data

US 2023/0319850 A1 Oct. 5, 2023

Related U.S. Application Data

(63) Continuation of application No. PCT/EP2021/077097, filed on Oct. 1, 2021.

(30) Foreign Application Priority Data

Oct. 2, 2020 (EP) .................................... 20199880

(51) Int. Cl.
*H04W 72/25* (2023.01)
*H04W 72/02* (2009.01)
(Continued)

(52) U.S. Cl.
CPC ........... *H04W 72/25* (2023.01); *H04W 72/02* (2013.01); *H04W 72/04* (2013.01); *H04W 72/0446* (2013.01)

(58) Field of Classification Search
CPC ..... H04W 74/04; H04W 16/14; H04W 92/18; H04W 72/25; H04W 72/02; H04W 72/04
See application file for complete search history.

(56) References Cited

U.S. PATENT DOCUMENTS 12,156,211 B2 * 11/2024 Mallick ............. H04W 72/0453
2020/0106566 A1 4/2020 Yeo et al.
(Continued)

FOREIGN PATENT DOCUMENTS

EP 20164706.2 3/2020
EP 20197035.7 9/2020
(Continued)

OTHER PUBLICATIONS

Fraunhofer HHI et al., "Resource Allocation for Mode 2 NR V2X", 3GPP TSG-RAN WG2 Meeting #108, Nov. 18-22, 2019, R2-1915555, 3GPP, USA.
(Continued)

*Primary Examiner* — Raj Jain
(74) *Attorney, Agent, or Firm* — Bridgeway IP Law Group, PLLC; Jihun Kim

(57) ABSTRACT

A user device, UE, for a wireless communication network is described that communicates with one or more network entities of the wireless communication network, like a base station or another UE. The UE receives from a network entity a transmission, the transmission including a control region, like a Physical Sidelink Control Channel, PSCCH, and a data region, like a Physical Sidelink Shared Channel, PSSCH. The transmission includes a first control message, like a $1^{st}$-stage SCI, in the control region, and a second control message, like a $2^{nd}$-stage SCI, in the data region. The second control message includes control data and occupies some or all of the resources allocated in the data region of
(Continued)

the transmission, or is associated with control data included in at least a part of the data region of the transmission.

19 Claims, 9 Drawing Sheets

(51) Int. Cl.
*H04W 72/04* (2023.01)
*H04W 72/0446* (2023.01)

(56) References Cited

U.S. PATENT DOCUMENTS

| | | | | |
|---|---|---|---|---|
| 2020/0288486 | A1 | 9/2020 | Kwak et al. | |
| 2021/0345184 | A1* | 11/2021 | Sarkis | H04W 74/0808 |
| 2022/0070935 | A1* | 3/2022 | Xue | H04W 74/0816 |
| 2022/0095369 | A1* | 3/2022 | Xue | H04L 5/001 |
| 2022/0322327 | A1* | 10/2022 | Park | H04L 1/1854 |
| 2022/0377748 | A1* | 11/2022 | He | H04W 4/70 |
| 2023/0081131 | A1 | 3/2023 | Selvanesan et al. | |
| 2023/0180342 | A1* | 6/2023 | Shin | H04L 1/1854<br>370/329 |
| 2023/0319850 | A1* | 10/2023 | Selvanesan | H04W 72/02<br>370/329 |

FOREIGN PATENT DOCUMENTS

| | | | |
|---|---|---|---|
| WO | 2020169024 | A1 | 8/2020 |
| WO | 2020197300 | A1 | 10/2020 |
| WO | 2021185960 | A1 | 9/2021 |
| WO | 2022058376 | A1 | 3/2022 |

OTHER PUBLICATIONS

Luling Liu, "Office Action for Chinese Application No. 202180068050.1", Jun. 26, 2025, CNIPA, China.

Huawei et al., "Sidelink physical layer structure for NR V2X", 3GPP TSG RAN WG1 #99, Nov. 9, 2019, 3GPP.

LG Electronics, "Discussion on feasibility and benefits for mode 2 enhancement", 3GPP TSG RAN WG1 Meeting #102-e. R1-2005749, Aug. 8, 2020, 3GPP.

LG Electronics, "Discussion on physical layer structure for NR sidelink", 3GPP TSG RAN WG1 Meeting #98bis. R1-1910777, Oct. 8, 2019, 3GPP.

Soo Bok Ji, "Office Action for Korean Application No. 10-2023-7015056", Jun. 11, 2025, KIPO, Republic of Korea.

Palencia Gutierrez, "European Office Action for EP Application No. 21786446.1", Jul. 16, 2025, EPO, Germany.

* cited by examiner 608
secondary memory
606
main memory
602
processor
604
600
610
I/F
612

NR SIDELINK MULTI-CONTROL/DATA MULTIPLEXING

CROSS-REFERENCE TO RELATED APPLICATIONS

This application is a continuation of copending International Application No. PCT/EP2021/077097, filed Oct. 1, 2021, which is incorporated herein by reference in its entirety, and additionally claims priority from European Application No. EP 20199880.4, filed Oct. 2, 2020, which is also incorporated herein by reference in its entirety.

The present application concerns the field of wireless communication systems or networks, more specifically, the transmission of control data to a user device, UE, of the wireless communication network. Embodiments of the present invention concern transmitting control data using a novel control message type or a plurality of control messages within one transmission.

BACKGROUND OF THE INVENTION

FIG. 1 is a schematic representation of an example of a terrestrial wireless network 100 including, as is shown in FIG. 1(*a*), the core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells 106$_1$ to 106$_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell 106$_2$ and that are served by base station $gNB_2$. Another user $UE_3$ is shown in cell 106$_4$ which is served by base station $gNB_4$. The arrows 108$_1$, 108$_2$ and 108$_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices 110$_1$ and 110$_2$ in cell 106$_4$, which may be stationary or mobile devices. The IoT device 110$_1$ accesses the wireless communication system via the base station $gNB_4$ to receive and transmit data as schematically represented by arrow 1121. The IoT device 110$_2$ accesses the wireless communication system via the user $UE_3$ as is schematically represented by arrow 112$_2$. The respective base station $gNB_1$ to $gNB_5$ may be connected to the core network 102, e.g. via the S1 interface, via respective backhaul links 114$_1$ to 114$_5$, which are schematically represented in FIG. 1(*b*) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links 116$_1$ to 116$_5$, which are schematically represented in FIG. 1(*b*) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length. For example, in 5G a subframe has a duration of 1 ms, as in LTE. The subframe includes one or more slots, dependent on the subcarrier spacing. For example, at a subcarrier spacing of 15 kHz the subframe includes one slot, at a subcarrier spacing of 30 kHz the subframe includes two slots, at a subcarrier spacing of 60 kHz the subframe includes four slots, etc. Each slot may, in turn, include 12 or 14 OFDM symbols dependent on the cyclic prefix, CP, length.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE- Advanced pro standard, or the 5G or NR, New Radio, standard, or the NR-U, New Radio Unlicensed, standard, or the IEEE 802.11 standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including space borne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard, or the IEEE 802.11 standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an “in-coverage” scenario. Another scenario is referred to as an “out-of-coverage” scenario. It is noted that “out-of-coverage” does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station, e.g., GSM, UMTS, LTE base stations, that may not support certain service, like NR V2X services.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2(*a*) is a schematic representation of an in-coverage scenario in which two UEs directly communicating with each other are both connected to a base station. The base station gNB has a coverage area that is schematically represented by the circle 150 which, basically, corresponds to the cell schematically represented in FIG. 1. The UEs directly communicating with each other include a first vehicle 152 and a second vehicle 154 both in the coverage area 150 of the base station gNB. Both vehicles 152, 154 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a Mode 3 configuration in LTE V2X.

FIG. 2(*b*) is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 156, 158 and 160 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 2(*b*) which is the out-of-coverage scenario does not necessarily mean that the respective Mode 2 UEs in NR or mode 4 UEs in LTE are outside of the coverage 150 of a base station, rather, it means that the respective Mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 150 shown in FIG. 2(*a*), in addition to the NR Mode 1 or LTE Mode 3 UEs 152, 154 also NR Mode 2 or LTE mode 4 UEs 156, 158, 160 are present. In addition, FIG. 2(*b*), schematically illustrates an out of coverage UE using a relay to communicate with the network. For example, the UE 160 may communicate over the sidelink with UE1 which, in turn, may be connected to the gNB via the Uu interface. Thus, UE1 may relay information between the gNB and the UE 160

Although FIG. 2(*a*) and FIG. 2(*b*) illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

It is noted that the information in the above section is only for enhancing the understanding of the background of the invention and, therefore, it may contain information that does not form prior art that is already known to a person of ordinary skill in the art.

SUMMARY

An embodiment may have a user device, UE, for a wireless communication network, wherein the UE is to communicate with one or more network entities of the wireless communication network, like a base station or another UE, wherein the UE is to receive from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the second control message includes control data and occupies some or all of the resources allocated in the data region of the transmission, or is associated with control data included in at least a part of the data region of the transmission.

Another embodiment may have a user device, UE, for a wireless communication network, wherein the UE is to communicate with one or more network entities of the wireless communication network, like a base station or another UE, wherein the UE is to receive from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes one or more further second control messages, like a further $2^{nd}$-stage SCI, in the data region.

According to another embodiment, a wireless communication system may have: a plurality of user devices, UEs, configured for a sidelink communication using, for example resources from a set of sidelink resources of the wireless communication system, wherein the plurality of UEs includes one or more inventive UEs, and wherein the plurality of UEs includes one or more of the further UEs.

Another embodiment may have a radio signal for a transmission in a wireless communication network, wherein the transmission includes a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the second control message includes control data and occupies some or all of the resources allocated in the data region for a payload transmission, or is associated with control data included in at least a part of the data region of the transmission.

Another embodiment may have a radio signal for a transmission in a wireless communication network, wherein the transmission includes a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes one or more further second control messages, like a further $2^{nd}$-stage SCI, in the data region.

According to another embodiment, a method for operating a user device, UE, of a wireless communication network, the UE communicating with one or more network entities of the wireless communication network, like a base station or another UE, may have the steps of: receiving from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the second control message includes control data and occupies some or all of the resources allocated in the data region of the transmission, or is associated with control data included in at least a part of the data region of the transmission.

According to another embodiment, a method for operating a user device, UE, of a wireless communication network, the UE communicating with one or more network entities of the wireless communication network, like a base station or another UE, may have the steps of: receiving from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes one or more further second control messages, like a further $2^{nd}$-stage SCI, in the data region.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings, in which the same or similar elements have the same reference signs assigned.

Figures 1A, 1B:
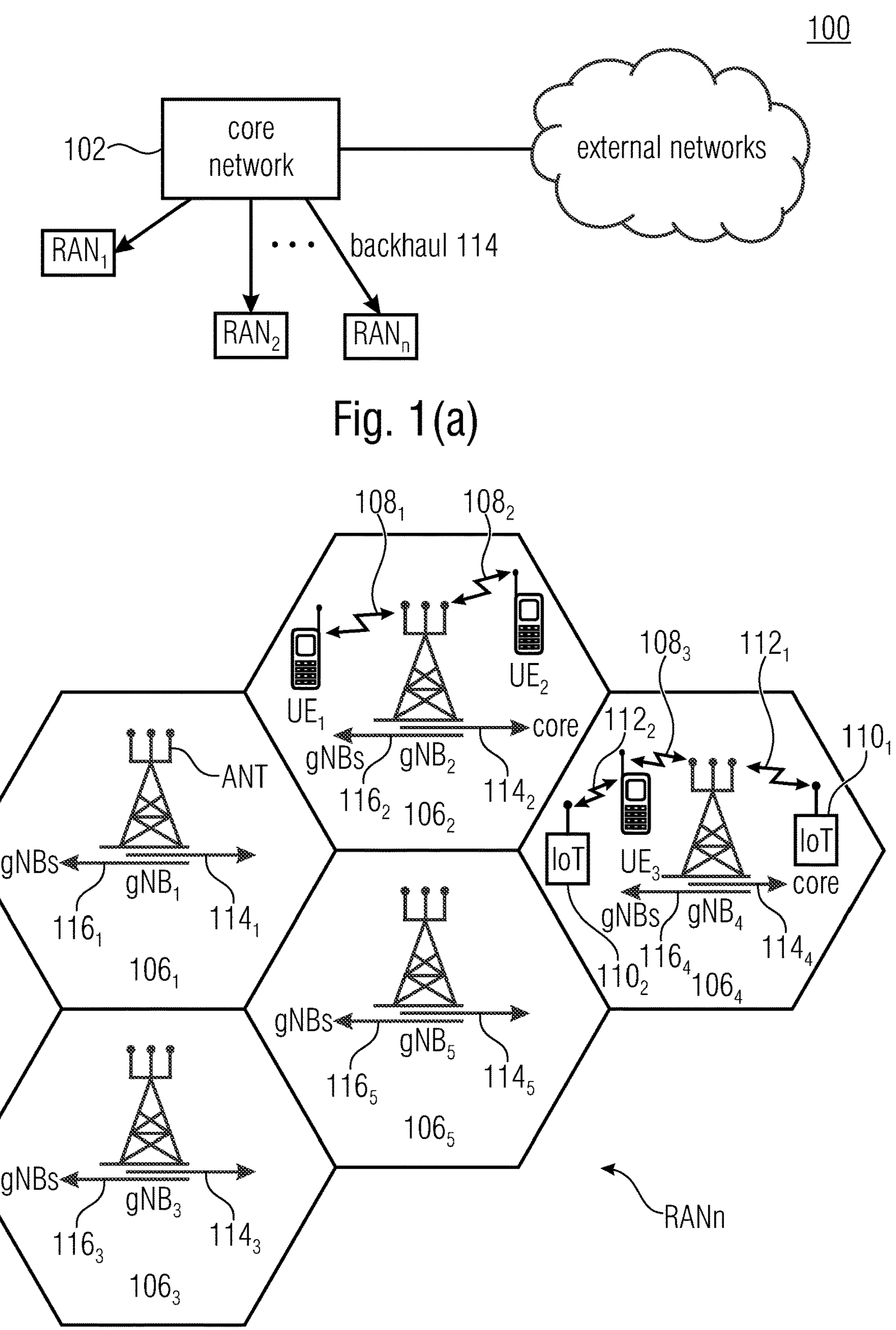
FIGS. 1(*a*) and 1(*b*) are a schematic representation of an example of a terrestrial wireless network, wherein FIG. 1(*a*) illustrates a core network and one or more radio access networks, and FIG. 1(*b*) is a schematic representation of an example of a radio access network RAN.
Figure 2A:
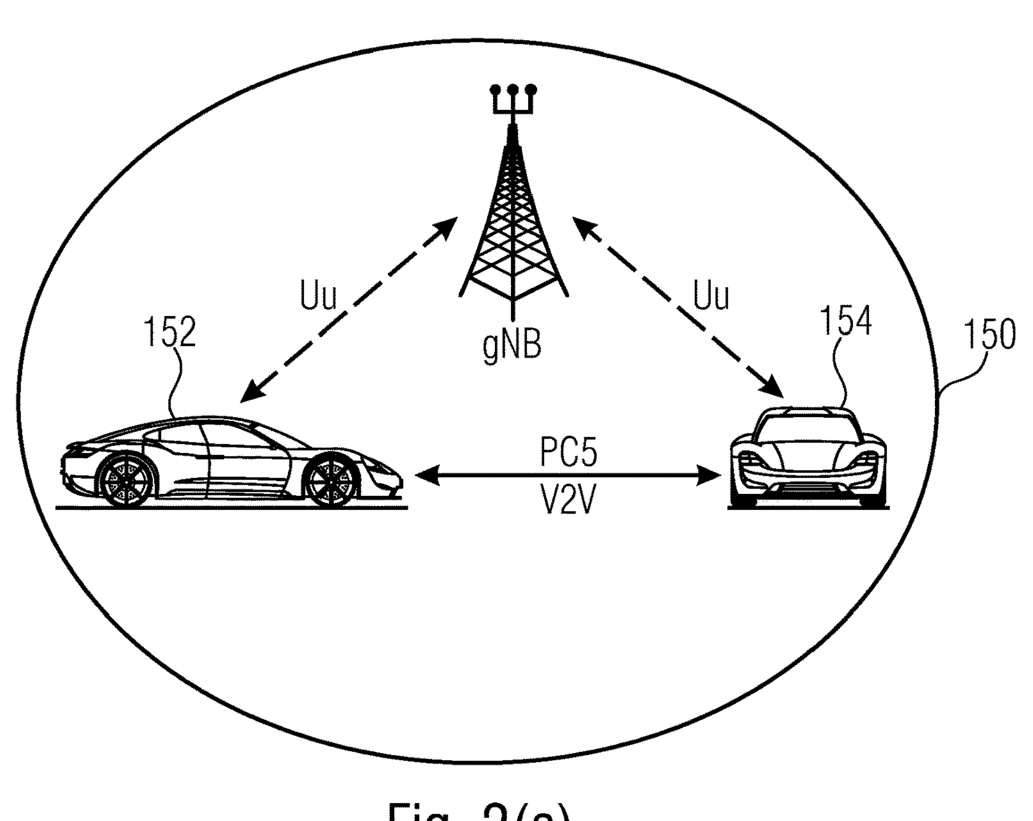
FIGS. 2(*a*) and 2(*b*) schematic represent in-coverage and out-of-coverage scenarios, wherein FIG. 2(*a*) is a schematic representation of an in-coverage scenario in which two UEs directly communicating with each other are both connected to a base station, and FIG. 2(*b*) is a schematic representation of an out-of-coverage scenario in which the UEs directly communicating with each other.
Figure 2B:
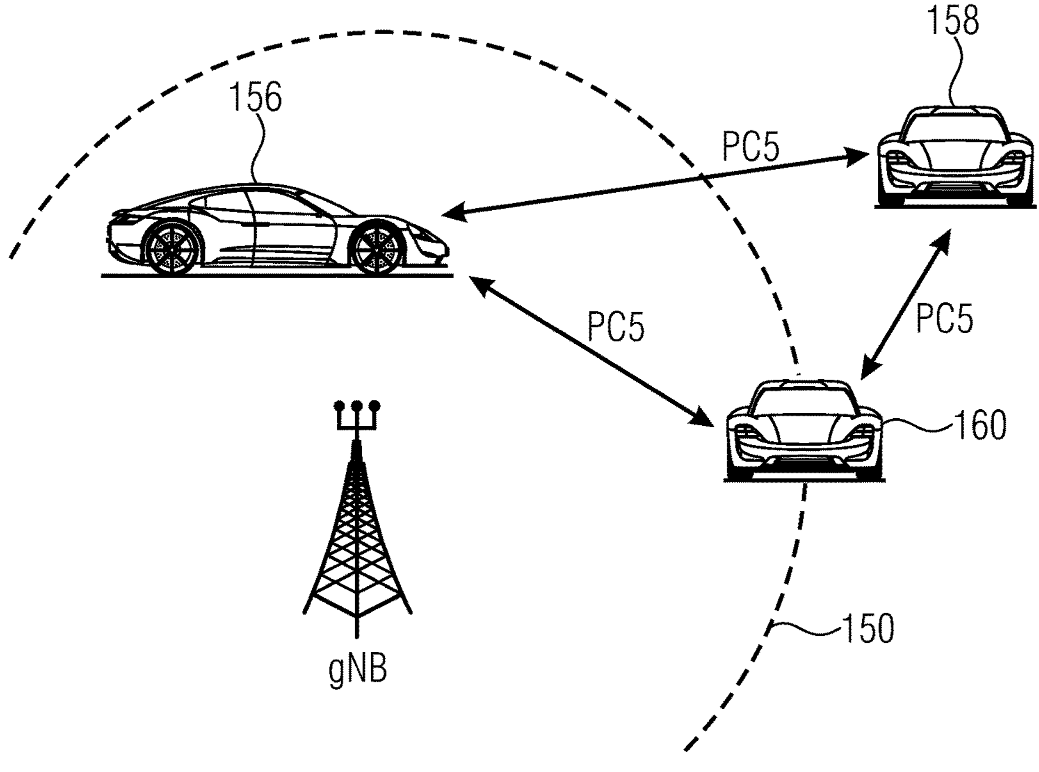

In a wireless communication system or network, like the one described above with reference to FIG. 1 or with reference to FIG. 2, payload, like payload data, to be transmitted among respective entities of the wireless communication network may be carried in what is known as one or more transport blocks, TBs. For example, when considering the 3GPP Release 16, NR V2X uses resource pools for the transmission and reception of data or data packets or payload data, and a resource pool may include a physical sidelink control channel, PSCCH, and a physical sidelink shared channel, PSSCH, among other physical layer channels. When a UE transmits a data packet in a transport block, TB, the transmission comprises one or more time slots formed by a continuous set of symbols across time and one or more sub channels (or subchannels) formed by a continuous set of frequency resources or resource blocks, RBs, across frequency. The symbols and the RBs include the PSCCH and the PSSCH. The PSCCH may occupy initial symbols in the time slot followed by the PSSCH symbols.

Figure 3:
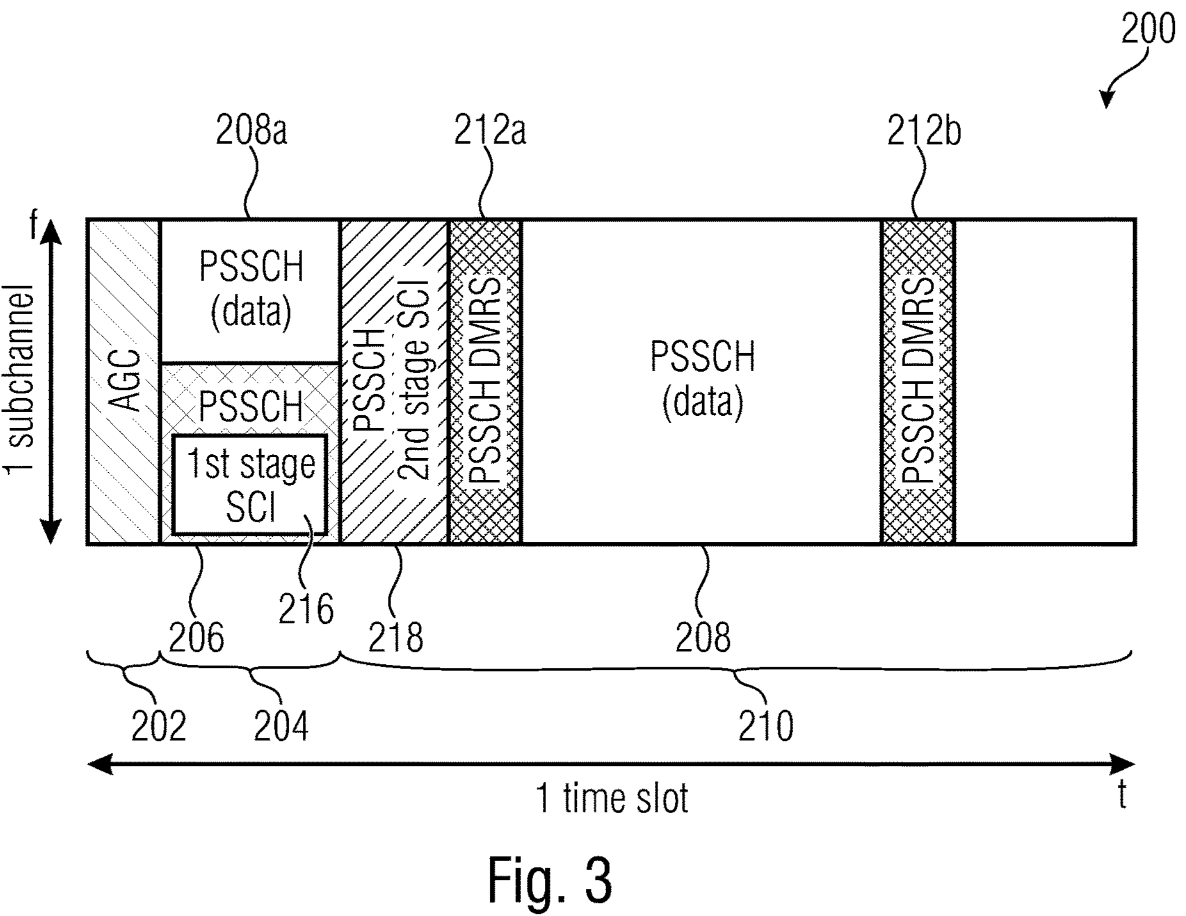
FIG. 3 illustrates an example of a transmission comprising one time slot defined by a plurality of symbols in the time domain, and one sub channel defined by a plurality of RBs in the frequency domain.

FIG. 3 illustrates an example of a transmission 200 comprising one time slot defined by a plurality of symbols in the time domain, and one sub channel defined by a plurality of RBs in the frequency domain. One or more initial symbols 202 are automatic gain control, AGC symbols, followed by symbols 204 occupied by the PSCCH 206. In FIG. 3, only a part of the RBs associated with the symbols 204 is occupied by the PSCCH and the remaining RBs are occupied by a first part 208*a* of the PSSCH 208. The remaining symbols 210 of the transmission 200 are occupied by the PSSCH 208. In other words, the transmission illustrated in FIG. 3 includes a control region 206 and a data region 208, including 208*a*. In the example of FIG. 3, the data region 208 also includes symbols 212*a*, 212*b* not used for the payload but for carrying demodulation reference signals, DMRSs.

Note, although the transmission in FIG. 3 depicts 1 subchannel in frequency domain, embodiments are not limited to a single subchannel. Thus the transmission in frequency domain may also span multiple subchannels, e.g. 5 subchannels. Furthermore, this depicts the logical structure of a transmission meaning that if more than one subchannel is used for a transmission, also frequency gaps between two subchannels may be defined.

In the control region or PSCCH 206, control information associated with the transmission is transmitted to inform a receiving UE about the presence of data or a data packet transmitted, or about the presence of one or more future transmissions in future time slots together with a number of information allowing the receiving UE to successfully decode the data packet carried in the PSSCH or data region 208. For example, in NR V2X, the control information may be divided into two stages, like the $1^{st}$ stage sidelink control information, SCI, 216 carried in the PSCCH or control region 206, and the $2^{nd}$ stage SCI 218 carried by some of the symbols of the PSSCH or data region 208.

In the example of FIG. 3, the $1^{st}$ stage SCI is transmitted in the PSCCH 206 is used to carry information related to the resource allocation of the PSSCH 208, along with information enabling sensing operations for mode 2 UEs. For example, the following parameters may be including the in the $1^{st}$ stage SCI 216, which is also referred to as SCI format 1-A:

- a priority of the transmission,
- a frequency resource assignment, which provides information regarding the resource allocation across frequency defining the subchannels where the data is transmitted in the PSSCH,
- a time resource assignment, which provides information regarding the resource allocation across time defining the time slots where the data is transmitted in the PSSCH,
- a resource reservation period, which provides information regarding repetitive resource reservation at the indicated period,
- a DMRS pattern,
- a $2^{nd}$ stage SCI format, which indicates the $2^{nd}$ stage SCI format that the UE may expect to receive in the PSSCH,
- a beta_offset indicator,
- a number of DMRS ports
- a modulation and coding scheme, MCS,
- an additional MCS table indicator,
- a Physical Sidelink Feedback Channel, PSFCH, overhead indication,
- one or more reserved fields.

A single $2^{nd}$ stage SCI 218 is transmitted in the PSSCH 208 together with the payload, like the data packet. The $2^{nd}$ stage SCI 218 carries information for the receiving UE to identify and decode the data in the PSSCH 208, along with information regarding, for example, the HARQ procedure and a SCI feedback. Currently, two $2^{nd}$ stage SCI formats are defined, namely SCI format 2-A and SCI format 2-B, and only one among the both of them may be associated for any given transmission. SCI format 2-A may be used when the transmission uses groupcast HARQ feedback option 2 in accordance with which the HARQ information includes either an acknowledgement, ACK, or a non-acknowledgement, NACK. It may also be used for blind retransmissions and when the group cast transmission is not associated with the minimum communication range requirement. The following parameters may be included in a $2^{nd}$ stage SCI having the SCI format 2-A:

- an HARQ process number,
- a new data indicator, NDI,
- a redundancy version of the transmission,
- a source ID indicating the source of the transmission,
- a destination ID indicating the destination of the transmission,
- an HARQ feedback enabled/disabled indicator,
- a cast type indicator,
- a CSI request.

The SCI format 2-B may be used when the transmission uses group cast HARQ feedback option 1, where the HARQ information includes only a NACK. It may also be used for blind retransmissions and in case the group cast transmission is associated with the minimum communication range requirement. The following parameters may be included in a $2^{nd}$ stage SCI having the SCI format 2-B:

- an HARQ process number,
- a new data indicator, NDI
- a redundancy version of the transmission,
- a source ID indicating the source of the transmission,
- a destination ID indicating the destination of the transmission,
- an HARQ feedback enabled/disabled indicator,
- a zone ID,
- a communication range requirement.

In the example described above with reference to FIG. 3, a transmission 200 among user devices of a wireless communication network is described, like a D2D- or a V2X-transmission over a sidelink using, for example, the PC5 interface.

A similar structure as explained with reference to FIG. 3 may also be used when transmitting payload between a UE and an RAN entity, like a base station. In accordance with further embodiments, the control messages may comprise of multiple of DCIs or one or more MAC control element(s) or a RRC message and a control message may indicate one or more further control messages in the PDSCH or PUSCH. The further control message pointing to control or payload data in the respective PDSCH or PUSCH. For improving the communication among entities within a wireless communication network, a so-called assistance information may be provided. For example, when considering transmissions over a sidelink among user devices of the wireless communication network, improvements in the reliability and the latency of transmissions, like transmissions occurring in vehicular communications or in public safety and commercial use cases, may be achieved by providing for an inter-UE coordination. The inter-UE coordination may provide assistance by a first UE to a second UE, for example, in the form of a set of resources determined by the first UE to be available or non-available for use by the second UE. Such a report, also referred to as assistance information message, may be sent to the second UE, which, in turn, may use the report to decide the transmission resources to be used for a transmission by the second UE. The report or assistance information may be included in one or more assistance information messages, AIMs, which may be transmitted using, for example, a $2^{nd}$ stage SCI carrying all of the AIM or pointing to resources in the PSSCH that carry the AIM, as is described, for example, in European patent application EP 20164706.2 "NR sidelink assistance information messages" filed on Mar. 20, 2020, the content of which is incorporated herewith by reference.

An AIM may also include other information for supporting an operation of a UE over the sidelink. For example, for the operation over the SL, the UE may obtain, in addition to the resource allocation information or instead of the resource allocation information, one or more of link related assistance information, distance related assistance information, geographical area related assistance information, group related assistance information, relay related assistance information. For example, with regard to the link quality information, the AIM may provide the UE with one or more of:

- a report including quality information about a link between two or more of the SL UEs, e.g., channel quality information or channel state information (CSI) or information on interference, or
- beamforming information, e.g., a Sounding Reference Signal, SRS, or a SRS Resource Indicator, SRI,
- one or more transmission power thresholds, e.g., information to restrict the transmit power of a UE in order to reduce the interference on links between further UEs or information on increasing the transmit power if there are only a few UEs in the scenario and the current interference is below a certain threshold to increase the coverage among the current UEs.

For example, with regard to the distance related assistance information, the AIM may provide the UE with one or more of:

- a minimum required communication range for a communication between two or more SL UEs, e.g., to determine whether a SL UE is to send a Hybrid Automatic Repeat Request, HARQ, feedback or not, or
- a physical distance between two or more SL UEs, e.g., to determine the transmission power to be used,
- a zone ID or a list of zone IDs, relating to the geographical position of one further UE and/or other further UEs, e.g., to be used to optimize transmission power or feedback procedures, e.g., HARQ, or to select links for communication.

For example, with regard to the geographical area related assistance information, the AIM may provide the UE with one or more of:

- geographical information, e.g., GPS coordinates, or
- path tracking information, e.g., to inform the further UEs about the direction and speed of the UE, or
- route information, e.g., to inform the further UEs about the potential exit of the UE from a platoon,
- a zone ID or a list of zone IDs, relating to the geographical position of one further UE and/or other further UEs, e.g., to be used to optimize transmission power or feedback procedures, e.g., HARQ, or to select links for communication.

For example, with regard to the group related assistance information, the AIM may provide the UE with one or more of:

- an identification of the group, e.g., a group ID, or
- an identification of a group leader, e.g., a group leader ID, or
- an identification of one or more group members, e.g., a group member ID, or
- configuration information, e.g., resource pool information indicating resources to be used for a communication within the group, or
- transmission related information, e.g., transmission parameters to be used for group communication, e.g., modulation and coding scheme, MCS, transmit power, timing advance, TA, HARQ operation,
- a list of group members, or
- trajectory information of the group members, e.g., to determine a possibility of a UE leaving the group, or
- a distance between member UEs or other distance-related information, like a vector with zone IDs, e.g., to determine whether to send HARQ feedback or not, or
- resources to be used for transmission within the resource pool, or
- information regarding an addition or a removal of one or more member UEs to or from the group.

For example, with regard to the relay related assistance information, the AIM may provide the UE with one or more of:

one or more relay UEs, or
a capacity of one or more relay UEs, or
a transmission mode of one or more relay UEs, or
an identification of one or more relay UEs, like a relay UE ID, or
a selected relay UE, or
one or more candidate relay UEs, or
a capacity of a set of one or more candidate relay UEs, or
a transmission mode of one or more candidate relay UEs, or
a distance and/or path information of one or more candidate relay UEs.

While conventional approaches for transmitting additional control information, like AIMs, among entities of a wireless communication network exist, such approaches may not be sufficient for addressing the required enhancement in a transmission among respective network entities, for example enhancements concerning improvements in the reliability and the latency of a communication, especially when the AIM is expected to be transmitted over the PHY layer.

Figure 4:
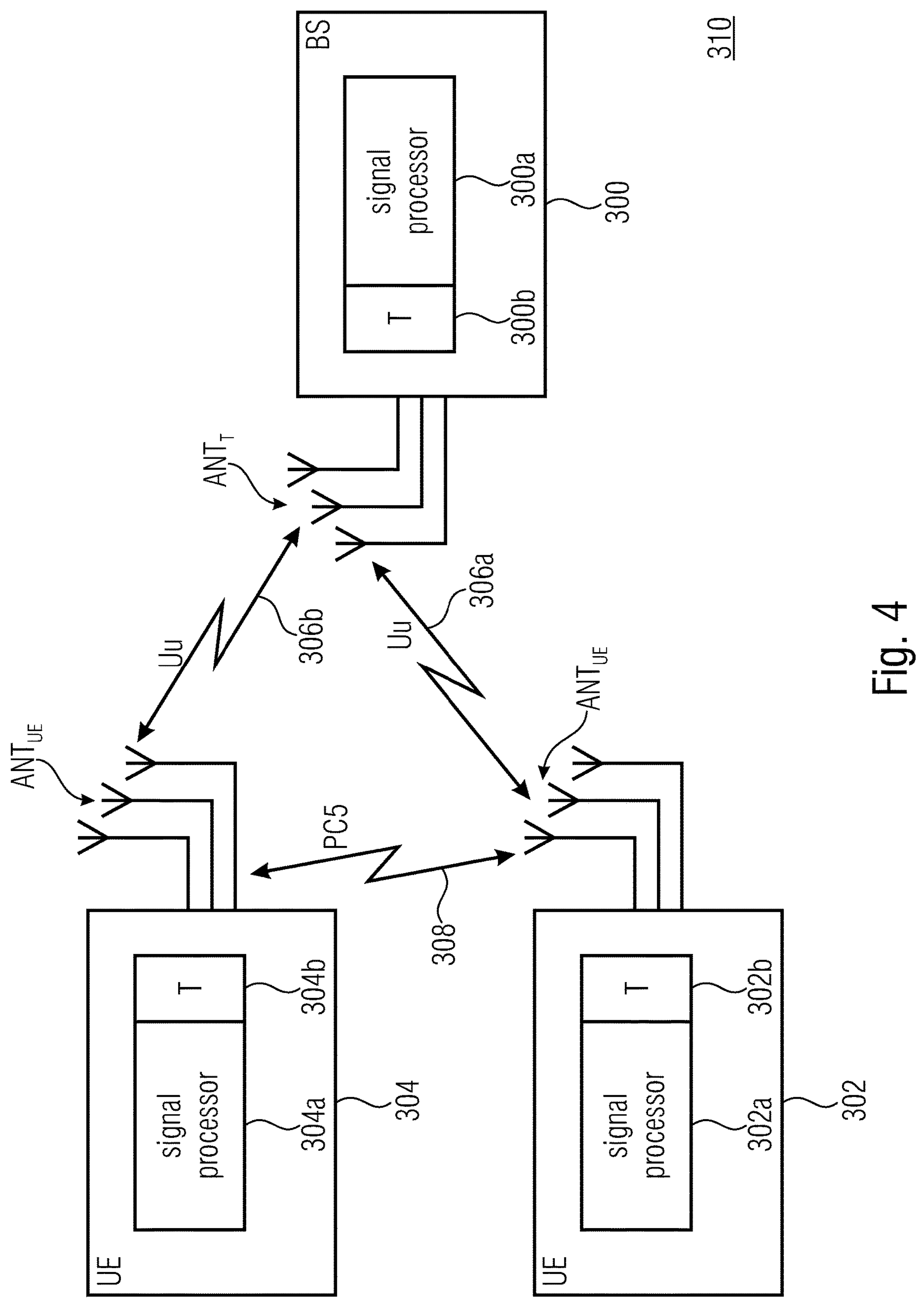
FIG. 4 is a schematic representation of a wireless communication system including a transmitter, like a base station, one or more receivers, like user devices, UEs, for implementing embodiments of the present invention.

Embodiments of the present invention address such issues and provide improvements for transmitting additional control information, like one or more AIMs, to a network entity, like a user device. In accordance with a first aspect of the inventive approach, first and second control messages are used among which the second control message has a novel format allowing for an improved transmission of additional control information, like one or more AIMs. In accordance with a second aspect, the conventional approach of using a first control message and a second control message is further improved by allowing the transmission of two or more second control messages thereby allowing for the transmission of additional control information, like one or more AIMs. Embodiments of the present invention may be implemented in a wireless communication system as depicted in FIG. 1 including base stations and users, like mobile terminals or IoT devices. FIG. 4 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306*a*, 306*b*, 308, like a radio link. The transmitter 300 may include one or more antennas ANTT or an antenna array having a plurality of antenna elements, a signal processor 300*a* and a transceiver 300*b*, coupled with each other. The receivers 302, 304 include one or more antennas $ANT_{UE}$ or an antenna array having a plurality of antennas, a signal processor 302*a*, 304*a*, and a transceiver 302*b*, 304*b* coupled with each other. The base station 300 and the UEs 302, 304 may communicate via respective first wireless communication links 306*a* and 306*b*, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 4, the one or more UEs 302, 304 of FIG. 4, and the base station 300 of FIG. 4 may operate in accordance with the inventive teachings described herein.

User Device

The present invention provides a user device, UE, for a wireless communication network, wherein the UE is to communicate with one or more network entities of the wireless communication network, like a base station or another UE,
wherein the UE is to receive from a network entity a transmission, the transmission including a control region, like a Physical Sidelink Control Channel, PSCCH, and a data region, like a Physical Sidelink Shared Channel, PSSCH,
wherein the transmission includes a first control message, like a $1^{st}$-stage SCI, in the control region, and a second control message, like a $2^{nd}$-stage SCI, in the data region, and
wherein the second control message
includes control data and occupies some or all of the resources allocated in the data region of the transmission, or
is associated with control data included in at least a part of the data region of the transmission.

In accordance with embodiments, the control data comprises control information useful to the UE that is transmitted in the data region, the control data being different from any payload to be transmitted in the data region.

In accordance with embodiments,
the first control message includes a parameter indicating the second control message format present in the data region, the parameter indicating that the second control message includes control data and occupies all of resources allocated in the data region of the transmission, and
responsive to the parameter, the UE is not to expect receiving any payload data in the data region but the control data, like an assistance information message, AIM.

In accordance with embodiments,
the first control message includes a parameter indicating the second control message format present in the data region, the parameter indicating that the second control message is associated with control data included in at least a part of the data region of the transmission,
the second control message includes information to be used for decoding the control data present in the data region, and
responsive to the parameter, the UE is not to expect receiving any payload data in some or all of the data region but the control data, like an AIM, and is to use the information from the second control message for decoding the control data present in the data region.

In accordance with embodiments,
the second control message includes one or more destination identifications, IDs, indicating one or more UEs to which the control data in the data region of the transmission is directed, or one or more group IDs indicating one or more groups of UEs to which the control data in the data region of the transmission is directed, and
the UE is to decode the control data from the data region of the transmission in case the second control message includes a destination ID that matches an ID of the UE or a group ID of a group of which the UE is a member.

In accordance with embodiments,
the first control message includes a portion of a destination ID or a group ID, and
the UE is to determine the transmission to be relevant to the UE from the decoded first control message when the portion of the destination ID or the group ID is associated with an ID of the UE.

The present invention provides a user device, UE, for a wireless communication network, wherein the UE is to communicate with one or more network entities of the wireless communication network, like a base station or another UE, wherein the UE is to receive from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes one or more further second control messages, like a further $2^{nd}$-stage SCI, in the data region.

In accordance with embodiments, the first control message includes a parameter pointing to the second control message, and wherein the second control message includes a parameter pointing to one of the further second control messages.

In accordance with embodiments, two or more further second control messages are included in the transmission, and wherein each further second control message includes a parameter pointing to a one following further second control messages.

In accordance with embodiments, the second control message includes control data and occupies some of the resources allocated in the data region of the transmission, or is associated with control data included in at least a part of the data region of the transmission, or is associated with payload data included in at least a part of the data region of the transmission.

In accordance with embodiments, a further second control message includes control data and occupies some of the resources allocated in the data region of the transmission, or is associated with control data included in at least a part of the data region of the transmission, or is associated with payload data included in at least a part of the data region of the transmission.

In accordance with embodiments, the first control message indicates a number of second control messages in the transmission associated with the first control message, and/or includes a multi-second control message format indicator indicating the presence of and/or the formats of the second control messages.

In accordance with embodiments, the transmission comprises one or more MAC elements, like a MAC PDU or a MAC header, indicating one or more UEs or one or more groups of UEs to which the control data in the data region of the transmission is directed, and the UE is to decode from the data region of the transmission the control data indicated by the MAC header to be directed to the UE.

In accordance with embodiments, the CRC of the second control message and/or a further second control message is scrambled with one or more destination identifications, IDs, indicating one or more UEs to which the control data in the data region of the transmission is directed, or one or more group IDs indicating one or more groups of UEs to which the control data in the data region of the transmission is directed, and/or the UE is to blindly decode the data region to obtain control data from the data region of the transmission that is relevant for the UE.

In accordance with embodiments, the first control message includes a portion of a destination ID or a group ID, and the UE is to determine the transmission to be relevant to the UE from the decoded first control message when the portion of the destination ID or the group ID is associated with an ID of the UE.

In accordance with embodiments, the UEs is configured or pre-configured with one or more transmission maps for the data region of the transmission, the transmission map indicating a plurality of parts of the data region, each part associated with one or more UEs or one or more groups of UEs to which the control data in that part of the data region of the transmission is processed, and the UE is to attempt to decode the parts of the data region of the transmission associated with the UE.

In accordance with embodiments, all of the parts of the data region within a transmission have the same size, or wherein some or all of the parts of the data region within a transmission have different sizes.

In accordance with embodiments, the UE is configured or pre-configured with the transmission map or with a transmission map identification, ID, at one or more of the following:

a system level, e.g., by the network, a gNB, a SIM-card, or is hard-coded in the UE, a resource pool level, e.g. in the resource pool configuration, a transmission level, e.g. in a control message, like a first DCI or a $1^{st}$ stage SCI, for the transmission of the transmission, a source level, e.g., one or more maps are configured by the source network entity sending the transmission and can vary between different network entities.

In accordance with embodiments, the UE is configured with the transmission map or with the transmission map identification, ID, at the transmission level, and wherein the first control message includes the transmission map or the transmission map ID.

In accordance with embodiments, each of the plurality of parts of the data region has associated therewith a part identification, ID, and wherein the one or more the UE is configured or pre-configured with the part ID at one or more of the following:

a system level, e.g., by the network, a gNB, a SIM-card, or is hard-coded in the UE, a resource pool level, e.g. in the resource pool configuration, a transmission level, e.g. in a control message, like a first DCI or a $1^{st}$ stage SCI, for the transmission of the transmission, a source level, e.g., one or more maps are configured by the source network entity sending the transmission and can vary between different network entities.

In accordance with embodiments, the UE is configured with the part ID at the transmission level, and wherein the first control message includes the part ID.

In accordance with embodiments, the second control message and/or a further second control message use one or more first aggregation levels being different from a second aggregation level used by a second control message, the one or more first aggregation levels being the same or different dependent on the nature of the control messages or the channel conditions between the source network entity sending the transmission and the UE.

In accordance with embodiments, the second control message and each further second control message includes one or more of the following parameters:

an index ID, a type of the control data, a cast type for which the control data is relevant, a duration for which the control data is valid, like an expiry timer, a destination ID, a resource pool ID within which the control data is relevant, a priority associated with the control data, an indication that the associated transmission in the data region contains control data, or payload data, or both, a time resource indicator value, a frequency resource indicator value, a zone ID indicating the geographical location or any other reference to the location of the UE, a minimum communication range within which the UE needs to be with respect to the source network entity.

In accordance with embodiments, the control data included in or associated with the second control message and/or with a further second control message comprises one or more of the following:

one or more reports or assistance information messages, AIMs, including resource allocation related assistance information, one or more reports or assistance information messages, AIMs, including sensing related information, one or more reports or assistance information messages, AIMs, including power saving related information, one or more reports or assistance information messages, AIMs, including DRX or DRX alignment related information, one or more reports or assistance information messages, AIMs, including group formation or group management related information, one or more reports or assistance information messages, AIMs, including channel state information, CSI, related information, e.g. interference power, one or more reports or assistance information messages, AIMs, including the geographical location or any other reference to the location of the UE, e.g. a zone ID, one or more reports or assistance information messages, AIMs, including a minimum communication range within which the UE needs to be with respect to the source network entity.

In accordance with embodiments, the control data included in or associated with the second control message comprises one or more AIMs, and the AIM indicates the resources in any one of the following manners:

by a list of all resources that are available in one or more time slots, by a list of all resources that are unavailable in one or more time slots, by a list of resources for which collisions are expected, e.g., a list of reserved resources where the further UE is expected to transmit as well, by one or more randomly selected resources that are available in one or more time slots, by a list of resource blocks that are unavailable/reserved within a priority range.

In accordance with embodiments, a resource comprises a set of time slots across time and a set of subchannels across frequency, or one or more resource blocks, RBs, across a time slot in time and across a sub channel in frequency.

In accordance with embodiments, the AIM indicates the resources across time in any one of the following manners:

by a bitmap across time, the bitmap indicating resources, like OFDM symbols or time slots or subframes or frames, where the resource set is defined, spanning either a portion or the entire length of the one BWP, by a starting resource, like a time slot or a subframe, and a duration of the resource set, by explicit resources numbers, like time slot or subframe numbers, by puncturing out resources mentioned explicitly or that are part of another set of resources or RP, by a starting resource, and periodic offsets for subsequent occurrences, by a pattern of symbols, time slots or subframes or frames, by a formula used to define the time resource indicator value, TRIV.

and/or the AIM indicates the resources across frequency in any one of the following manners:

by a bitmap, the bitmap the bitmap indicating resources, like resource blocks, across the one BWP, by a starting resource, like a resource block, and a number of resources for a resource set, by multiple starting resources, like resource blocks, and ending resources, if the resource set is non-contiguous over frequency, by explicit resource indices, like resource block indices, by puncturing out resources mentioned explicitly or that are part of another set of resources or RP, by a starting resource, and periodic offsets for subsequent occurrences, by a pattern of resource blocks or subchannels, by a formula used to define the frequency resource indicator value, FRIV.

and/or the AIM indicates the resources across time and frequency in any one of the following manners:

by a matrix, the matrix indicating the resources across time, like symbols, time slots or subframes or frames, and across frequency, like resource blocks or subchannels, by a pattern, the pattern indicating the resources across time, like symbols, time slots or subframes or frames, and across frequency, like resource blocks or subchannels.

In accordance with embodiments, the second control message and/or a further second control message includes a group ID, and wherein the group ID is mapped to UEs that are expected to receive control data associated with a certain event, like an emergency situation, e.g., a weather warning, that travel with a certain region, urban UEs traveling within congested city roads, and the UEs is configured, pre-configured or hard-coded to receive transmissions pertaining to the group IDs.

In accordance with embodiments, the UE is to communicate with one or more further UEs using a sidelink, SL, interface, like a PC5 interface, and/or one or more radio access network, RAN, entities of the wireless communication system, like one or more base stations, using a radio interface, like a Uu interface, or using a shared access band, like an unlicensed band.

In accordance with embodiments, the UE is to communicate with one or more further UEs using a sidelink, SL, interface, like a PC5 interface, the first control message is a $1^{st}$ stage SCI, the second control message is a $2^{nd}$ stage SCI, and the further second control message is a $2^{nd}$ stage SCI.

In accordance with embodiments, the data region of the transmission extends across one or more time slots.

In accordance with embodiments, the first control message includes a slot sharing indicator indicating that the resources of the data region are shared among multiple UEs.

In accordance with embodiments, the control data in the transmission includes one or more reports or assistance information messages, AIMs, including resource allocation related assistance information, responsive to a trigger for a transmission, the UE is to determine a candidate resource set for the transmission by selecting resources for the transmission within a selection window following the trigger, wherein the UE is to select the resources by taking into consideration sensing results obtained by the UE during a sensing window preceding the trigger, the sensing results indicating whether certain resources are available or unavailable for the transmission, and the UE considers a received report or AIM, like an AIM including sensing results, for selecting resources for the transmission.

In accordance with embodiments, the UE and/or the further UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a base station e.g. gNB, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a transceiver, or any sidelink capable network entity.

System/Network

The present invention provides a wireless communication system, comprising:

a plurality of user devices, UEs, configured for a sidelink communication using, for example resources from a set of sidelink resources of the wireless communication system, wherein the plurality of UEs comprises one or more inventive UEs, and wherein the plurality of UEs comprises one or more of the further UEs.

In accordance with embodiments, e.g., in case the further UE is out-of-coverage or is operating in Mode 2, the further UE is to obtain a candidate resource set for a transmission by selecting resources for the transmission within a selection window of the further UE, wherein the further UE is to select the resources by taking into consideration sensing results obtained by the further UE during a sensing window of the further UE, the sensing results indicating whether certain resources are available or unavailable for the transmission, and send one or more AIMs including the sensing results and/or the candidate resource set.

In accordance with embodiments, the further UE is to obtain resources for the AIM from resources provided to the further UE by a base station of the wireless communication system directly, e.g., in case the UE is in Mode 1 or in-coverage, or indirectly via a relay, e.g., in case the UE is in Mode 2 or in- or out-of-coverage.

In accordance with embodiments, the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Radio Signal

The present invention provides a radio signal for a transmission in a wireless communication network, wherein the transmission includes a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the second control message includes control data and occupies some or all of the resources allocated in the data region for a payload transmission, or is associated with control data included in at least a part of the data region of the transmission.

The present invention provides a radio signal for a transmission in a wireless communication network, wherein the transmission includes a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes one or more further second control messages, like a further $2^{nd}$-stage SCI, in the data region.

Methods

The present invention provides a method for operating a user device, UE, of a wireless communication network, the UE communicating with one or more network entities of the wireless communication network, like a base station or another UE, the method comprising:

- receiving from a network entity a transmission, the transmission including a control region, like a Physical Sidelink Control Channel, PSCCH, and a data region, like a Physical Sidelink Shared Channel, PSSCH,
- wherein the transmission includes a first control message, like a $1^{st}$-stage SCI, in the control region, and a second control message, like a $2^{nd}$-stage SCI, in the data region, and
- wherein the second control message
  - includes control data and occupies some or all of the resources allocated in the data region of the transmission, or
  - is associated with control data included in at least a part of the data region of the transmission.

The present invention provides a method for operating a user device, UE, of a wireless communication network, the UE communicating with one or more network entities of the wireless communication network, like a base station or another UE, the method comprising:

- receiving from a network entity a transmission, the transmission including a control region, like a Physical Sidelink Control Channel, PSCCH, and a data region, like a Physical Sidelink Shared Channel, PSSCH,
- wherein the transmission includes a first control message, like a $1^{st}$-stage SCI, in the control region, and a second control message, like a $2^{nd}$-stage SCI, in the data region, and
- wherein the transmission includes one or more further second control messages, like a further $2^{nd}$-stage SCI, in the data region.

Computer Program Product

Embodiments of the present invention provide a computer program product comprising instructions which, when the program is executed by a computer, cause the computer to carry out one or more methods in accordance with the present invention.

Embodiments of the present invention are described in the following with reference to a communication of a user device, UE, over the sidelink so that the transmission includes a PSCCH as the control region and a PSSCH as a data region. The first control message may be a $1^{st}$ stage SCI and the second control message may be a $2^{nd}$ stage SCI. Thus, a transmission over a sidelink is a combination of the PSCCH and the PSSCH in one or more time slots, as explained above with reference to FIG. 3, and the PSCCH may include a $1^{st}$ stage SCI or a $1^{st}$ stage control information, and the PSSCH may include a $2^{nd}$ stage SCI or a $2^{nd}$ stage control information along with the data. In accordance with embodiments of the present invention, the PSSCH may include a $2^{nd}$ stage SCI having a novel format or more than one $2^{nd}$ stage SCI may be included. The inventive approach allows for improving a transmission as it opens up possibilities for combining $1^{st}$ and $2^{nd}$ stage SCIs in an improved manner, for example, the PSSCH may include a new format $2^{nd}$ stage SCI only, i.e., there is no transmission of payload, i.e., no data packets are included in the PSSCH. In other words, all resources allocated in the PSSCH to payload is occupied by the $2^{nd}$ stage SCI which, in turn, includes additional control information, like the AIM. In accordance with other embodiments, the PSSCH may include a plurality of $2^{nd}$ stage SCIs, i.e., two or more $2^{nd}$ stage SCIs. The two or more $2^{nd}$ stage SCIs may include conventional SCIs pointing to the payload, like payload or a data packet carried in the PSSCH, or they may point to a data transmission in the PSSCH, which contains the additional control information, like the AIM, or they may include a $2^{nd}$ stage SCI having the novel format, i.e., a $2^{nd}$ stage SCI including the AIM, or combinations thereof.

The additional control information, like the one or more AIMs, may carry different types of content, like the content described above. For example in case of an AIM, sensing results, candidate resource sets or exact resources to be used for a transmission by a receiving UE, embodiments of the invention are directed to different solutions for addressing the fact that the AIMs may include different contents.

Further embodiments of the inventive approach are directed to potential updates or changes in the 1st stage SCI so as to facilitate the use of the inventive $2^{nd}$ stage SCIs, along with potential new parameters to be included in the new $2^{nd}$ stage SCIs. Timing aspects regarding the transmission of AIMs are described, for example, in European patent application 20197035.7 "Timing aspects for NR SL assistance information messages" filed on Sep. 18, 2020, the contents of which is incorporated herewith my reference.

First Aspect

The present invention, in accordance with embodiments of the first aspect, provides a user device, UE, 302 (see FIG. 4) for a wireless communication network that communicates with one or more network entities of the wireless communication network, like the base station 300 or another UE 304 in FIG. 4. UE 302 receives from the network entity 300, 304 a transmission 306*a*, 308 that includes a control region and a data region. The transmission 306*a*, 308 includes a first control message in the control region, and a second control message in the data region. The second control message includes control data and occupies all of the resources allocated in the data region for a payload transmission, or it is associated with control data included in at least a part of, but may occupy the entirety of, the data region of the transmission. The control data comprises or is control information useful to the UE, also referred to as the receiving or RX UE. The control information comprises for example the above described assistance information that is transmitted in the data region instead of the actual payload. In other words, the control data or control information, like an AIM, is different from conventional payload that is conventionally the actual transmitted packet in the data region.

Figure 5:
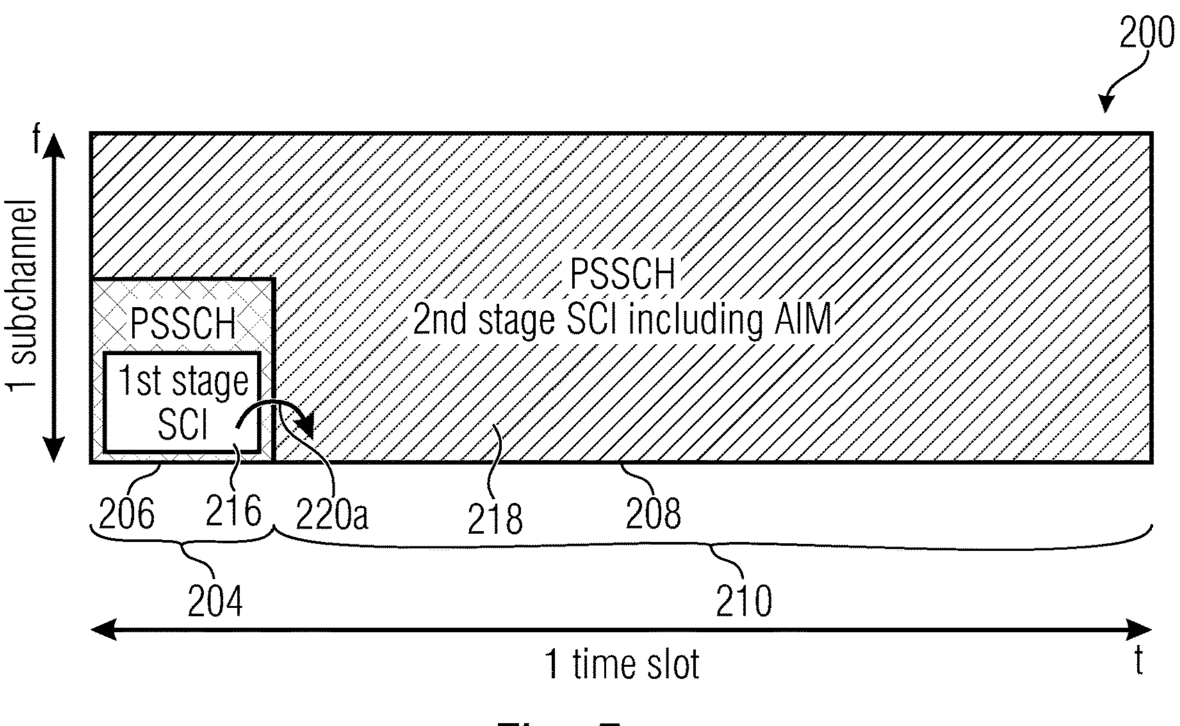
FIG. 5 illustrates a transmission including in a PSSCH a $2^{nd}$ stage SCI including additional control data or one or more AIMs and occupying all of the resources of the PSSCH allocated for the payload in accordance with an embodiment of the first aspect of the present invention.

In accordance with a first embodiment of the first aspect of the present invention, a new $2^{nd}$ stage SCI is provided that occupies all resources allocated in an associated PSSCH for the transmission of payload. Thus, the control data is part or inside the $2^{nd}$ stage SCI. In other words, the $2^{nd}$ stage SCI occupies the entire data region, meaning all symbols meant to be used in the PSSCH for a data transmission, are to be used for the $2^{nd}$ stage SCI, possibly containing an AIM. As described above with reference to FIG. 3, there may be some symbols inside the PSSCH that are used for the PSSCH not used for a data transmission but for DMRSs. FIG. 5 illustrates an embodiment of the first aspect of the present invention using a $2^{nd}$ stage SCI occupying all resources in a PSSCH allocated for the data transmission. FIG. 5, like FIG. 3, illustrates a transmission 200. For ease of understanding, the AGC and DMRS symbols are not illustrated in FIG. 5. Like in FIG. 3, also in FIG. 5, the transmission 200 includes the first control message or $1^{st}$ stage SCI 216 in the control region or PSCCH 206, and in accordance with the inventive concept, the entire set of resources allocated in the data region or PSSCH 208 for the data transmission or the payload is occupied by a $2^{nd}$ stage SCI 218.

Thus, in accordance with the present embodiment, the $2^{nd}$ stage SCI 218 occupies the entirety of the resources allocated in the PSSCH 208 for the transmission. The $1^{st}$ stage SCI 216 points to the $2^{nd}$ stage SCI 218, as is indicated at 220*a*, by using a $2^{nd}$ stage SCI format indicator informing the UE receiving the transmission about the $2^{nd}$ stage SCI format so as to let the receiving UE know that all data transmission or payload resources in the corresponding PSSCH 208 does not contain such data or payload but contains an AIM. In other words, responsive to the $1^{st}$ stage SCI indicating the $2^{nd}$ stage SCI format indicator, the receiving UE does not expect to receive any payload or any data packet in the PSSCH but knows that the information included in the PSSCH is control information, like the AIM.

In accordance with embodiments, employing a $2^{nd}$ stage SCI that occupies all resources in a PSSCH may be advantageous in situations in which the AIM includes sensing results that occupy more than a few symbols because the AIM actually indicates all the resources within a period of time, say the sensing window of the UE transmitting the AIM, and whether the resources are available/non-available for a transmission. It is also possible for the AIM to include measurement data regarding the sidelink channel state information (SCI) such as the measured Sidelink Reference Signal Received Power, SL-RSRP, for each of these resources. In both these cases, the size of the AIM is considerably large, and may occupy all the available resources within the PSSCH. The receiving UE may use the additional information in the AIM when selecting resources for the UE's transmission.

In accordance with embodiments, the transmission including the $2^{nd}$ stage SCI 218 occupying all resources allocated in a respective PSSCH for a data transmission may be sent to a plurality of receiving UEs, for example in situations in which an AIM includes sensing information that may be relevant to a plurality of UEs being located in the vicinity of the UE that created the AIM and that transmitted the AIM, for example, UEs using the same resource pool or belonging to the same group. In such embodiments, the $2^{nd}$ stage SCI may include a plurality of receiving UE destination IDs or one or more group IDs indicating member UEs of a certain group. When sending the transmission including the AIM in the $2^{nd}$ stage SCI, UEs receiving this transmission may determine that the additional control information or AIM is intended for them using the included destination IDs. A receiving UE considers an AIM to be directed to it when a destination ID included in the $2^{nd}$ stage SCI matches the UEs ID. In accordance with such embodiments, the $2^{nd}$ stage SCI may include a destination ID field, which allows including a single UE ID, a plurality of UE IDs, a single group ID or a plurality of group IDs. Worded differently, the destination ID field allows using a unicast ID, a groupcast ID or broadcast ID. Further, the $2^{nd}$ stage SCI that is used for occupying all allocated resources in a PSSCH may include an AIM indicating available/non-available resources for a transmission, for example, in the following way:

- by a list of all resource blocks, RBs, that are available in one or more time slots,
- by a list of all resource blocks, RBs, that are unavailable in one or more time slots,
- by a list of resource blocks, RBs, for which collisions are expected, e.g., a list of reserved resources where the further UE is expected to transmit as well,
- by one or more randomly selected resources that are available in one or more time slots,
- by a list of resource blocks that are unavailable/reserved within a priority range.

For example, the AIM indicates the resources across time in any one of the following manners:

- by a bitmap across time, the bitmap indicating resources, like OFDM symbols or time slots or subframes or frames, where the resource set is defined, spanning either a portion or the entire length of the one BWP,
- by a starting resource, like a time slot or a subframe, and a duration of the resource set,
- by explicit resources numbers, like time slot or subframe numbers,
- by puncturing out resources mentioned explicitly or that are part of another set of resources or RP,
- by a starting resource, and periodic offsets for subsequent occurrences,
- by a pattern of symbols, time slots or subframes or frames,
- by a formula used to define the time resource indicator value, TRIV defined in TS38.214 as follows:

```
if N = 1
        TRIV = 0
    elseif N = 2
        TRIV = t1
    else
        if (t2 − t1 − 1) ≤ 15
            TRIV = 30 (t2 − t1 − 1) + t1 + 31
        else
            TRIV = 30 (31 − t2 + t1) + 62 − t1
        end if
    end if
```

where,

- N indicates the number of time slots indicated by the AIM, where
  - 0 means the time slot where the AIM was received,
  - 1 means the time slot where the AIM was received as well as one more future time slot with respect to the time slot the AIM was received,
  - 2 means the time slot where the AIM was received as well as two more future time slots with respect to the time slot the AIM was received,
- $t_1$ indicates the first future resource time slot with respect to the time slot the AIM was received, and
- $t_2$ indicates the second future resource time slot with respect to the time slot the AIM was received.

The AIM may indicate the resources across frequency in any one of the following manners:

- by a bitmap, the bitmap the bitmap indicating resources, like resource blocks, across the one BW P,
- by a starting resource, like a resource block, and a number of resources for a resource set,
- by multiple starting resources, like resource blocks, and ending resources, if the resource set is non-contiguous over frequency,
- by explicit resource indices, like resource block indices,
- by puncturing out resources mentioned explicitly or that are part of another set of resources or RP,
- by a starting resource, and periodic offsets for subsequent occurrences,
- by a pattern of resource blocks or subchannels,
- by a formula used to define the frequency resource indicator value, FRIV, defined in TS38.214 as follows:

$$FRIV = n_{subCH,1}^{start} + \sum_{i=1}^{L_{subCH}-1} \left(N_{subchannel}^{SL} + 1 - i\right).$$

The AIM may indicate the resources across time and frequency in any one of the following manners:

- by a matrix, the matrix indicating the resources across time, like symbols, time slots or subframes or frames, and across frequency, like resource blocks or subchannels,
- by a pattern, the pattern indicating the resources across time, like symbols, time slots or subframes or frames, and across frequency, like resource blocks or subchannels.

Figure 6:
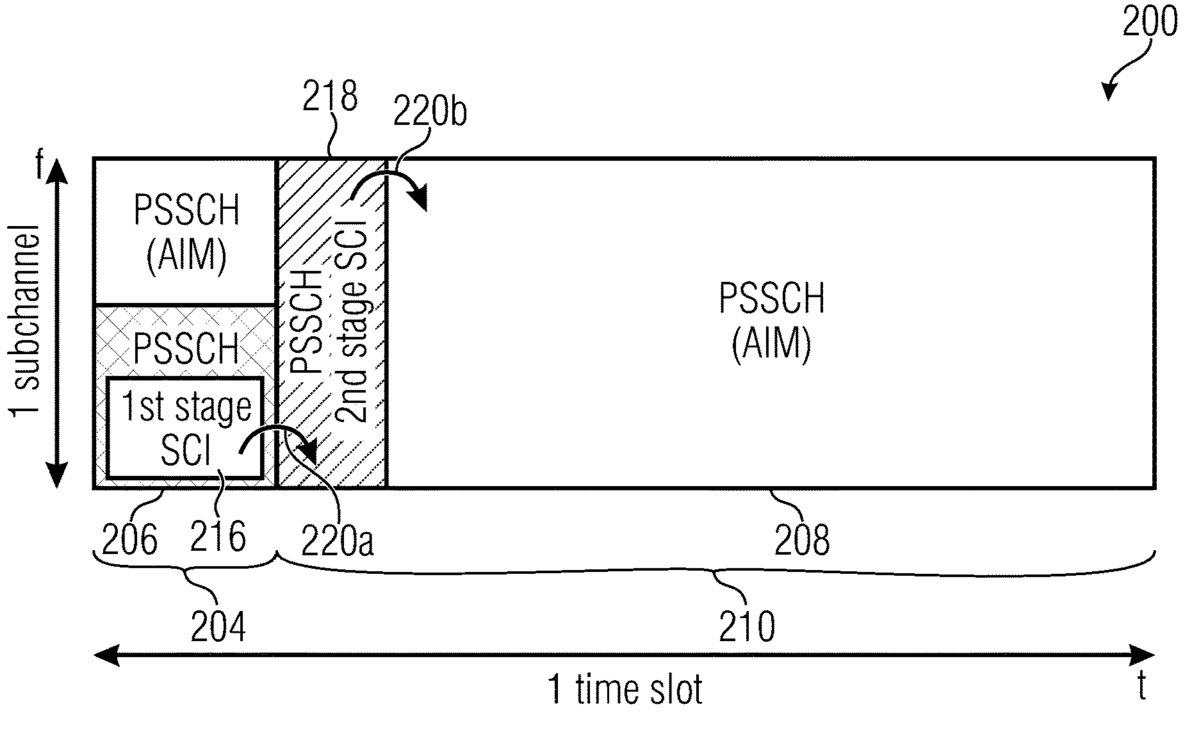
FIG. 6 illustrates a transmission including in a PSSCH a $2^{nd}$ stage SCI associated with additional control data or one or more AIMs occupying all of the resources of the PSSCH allocated for the payload in accordance with an embodiment of the first aspect of the present invention.

In accordance with a second embodiment of the first aspect of the present invention, a novel $2^{nd}$ stage SCI is provided that is associated with data in the PSSCH which represents the additional control information or AIM. Thus, the control data is not part of or inside the $2^{nd}$ stage SCI but is outside the $2^{nd}$ stage SCI. In other words, in accordance with such embodiments, the $2^{nd}$ stage SCI may include control information and the actual additional control data or AIM occupies the some or all of the resources of the PSSCH allocated for the payload, as indicated, for example, by the $1^{st}$ stage SCI. FIG. 6 illustrates such an embodiment of the present invention using a novel $2^{nd}$ stage SCI pointing to the additional control information or to one or more AIMs occupying all resources allocated in the PSSCH for the payload. The $2^{nd}$ stage SCI 218 does not include the control information or AIM itself, rather, it includes information, as indicated at 220*b*, that a receiving UE may use to decode the control information or AIM that is present in the PSSCH 208. As is indicated at 220*a*, the $1^{st}$ stage SCI 216 points to the $2^{nd}$ stage SCI 218 which, in turn, as is indicated at 220*b*, points to the AIM(s) contained in the remaining part of the data region.

In accordance with embodiments, the PSSCH may include a plurality of control information or AIMs for different UEs, and the $2^{nd}$ stage SCI 218 includes a plurality of destination IDs, in a similar way as described above with reference to the embodiment of FIG. 5. This allows making the receiving UEs for which the one or more AIMs are foreseen or intended become aware that an AIM, which is included in the PSSCH, is actually meant for the respective UEs. In accordance with further embodiments, in case one or more AIMs are relevant for all UEs of a certain or particular group, a group ID may be included in the $2^{nd}$ stage SCI, instead of or in addition to individual UE IDs. This may be employed, for example, when the one or more AIMs include sensing results, candidate resource sets or channel state information that are relevant to a plurality of UEs or to all of the UEs within a group. In case the AIM includes specific resources to be used only by the receiving UE for its own transmission, it may be considered relevant only for this receiving UE and, hence, only a single destination ID may be included indicating the specific receiving UE to which the UE is directed or for which it is foreseen. The AIM included in the data region 208 contains resource locations that may be indicated in a way as described above with reference to FIG. 5.

In accordance with the embodiment described with reference to FIG. 6, the $2^{nd}$ stage SCI 218 may include a destination ID field so as to include a single UE ID, a plurality of UE IDs, a single group ID or a plurality of group IDs.

In accordance with yet further embodiments, the control information or AIM may only occupy a part of the resources allocated for the payload in the PSSCH, while the remaining resources allocated for the payload in the PSSCH carry payload, like data packets. In this case, the $2^{nd}$ stage SCI may indicate that the PSSCH contains both control information as well as data payload.

Second Aspect

In accordance with embodiments of the second aspect of the present invention, a UE 302 (see FIG. 3) is provided that communicates with one or more network entities 300, 304 of a wireless communication network. The UE 302 receives a transmission 306*a*, 308 from a network entity 300, 304 that includes a control region and a data region. A first control message is provided in the control region and a plurality of second control messages are provided in the data region.

In accordance with embodiments, the first control message may include a parameter pointing to a first part of a second control message, and the first part of a second control message may include a parameter pointing to a further second control message so that the second control messages are pointed to by a preceding second control message. Thus, in accordance with embodiments of the second aspect of the present invention, a conventional transmission is modified in such a way that in addition to the first control message in the control region and to the second control message in the data region, one or more further second control messages are provided in the data region. The second control message may be a second control message, as described above with reference to the first aspect of the present invention, that

- occupies some of the resources allocated for payload data in the data region of the transmission and includes the control data, or
- occupies some of the resources allocated for payload data in the data region of the transmission and that is associated with the control data that occupies further resources allocated for payload data in the data region of the transmission.

In accordance with other embodiments, the second control message may be a conventional second control message that occupies some of the resources allocated for payload data in the data region of the transmission and that is associated with payload data that occupies further resources allocated for payload data in the data region of the transmission. In other words, the second control message may be a conventional second control message associated with payload data included in at least a part of the data region of the transmission.

In the following, embodiments of the second aspect of the present invention are also described with reference to a sidelink communication, so that the first control message may be a $1^{st}$ stage SCI, and the second control messages may be $2^{nd}$ stage SCIs. Embodiments of the present invention cover the following combinations $2^{nd}$ stage SCIs as follows:

| first $2^{nd}$ stage SCI | second $2^{nd}$ stage SCI | |
|---|---|---|
| Type 1 | Type 1 | $1^{st}$ stage SCI → new $2^{nd}$ stage SCI containing AIM → new $2^{nd}$ stage SCI containing AIM |
| Type 1 | Type 2 | $1^{st}$ stage SCI → new $2^{nd}$ stage SCI containing AIM → new $2^{nd}$ stage SCI associated with data packet containing AIM |
| Type 1 | Type 3 | $1^{st}$ stage SCI → new $2^{nd}$ stage SCI containing AIM → old $2^{nd}$ stage SCI associated with data packet containing payload data |
| Type 2 | Type 1 | $1^{st}$ stage SCI → new $2^{nd}$ stage SCI associated with data packet containing AIM → new $2^{nd}$ stage SCI containing AIM |

-continued

| first $2^{nd}$ stage SCI | second $2^{nd}$ stage SCI | |
|---|---|---|
| Type 2 | Type 2 | $1^{st}$ stage SCI → new $2^{nd}$ stage SCI associated with data packet containing AIM → new $2^{nd}$ stage SCI associated with data packet containing AIM |
| Type 2 | Type 3 | $1^{st}$ stage SCI → new $2^{nd}$ stage SCI associated with data packet containing AIM → old $2^{nd}$ stage SCI associated with data packet containing payload data |
| Type 3 | Type 1 | $1^{st}$ stage SCI → old $2^{nd}$ stage SCI associated with data packet containing payload data → new $2^{nd}$ stage SCI containing AIM |
| Type 3 | Type 2 | $1^{st}$ stage SCI → old $2^{nd}$ stage SCI associated with data packet containing payload data → new $2^{nd}$ stage SCI associated with data packet containing AIM → |
| Type 3 | Type 3 | $1^{st}$ stage SCI → old $2^{nd}$ stage SCI associated with data packet containing payload data → old $2^{nd}$ stage SCI associated with data packet containing payload data |

Type 1 = SCI occupying some of the resources allocated in the data region for the payload transmission and including control data
Type 2 = SCI occupying some of the resources allocated in the data region for the payload transmission and associated with control data occupying further resources allocated in the data region for the payload transmission
Type 3 = SCI occupying some of the resources allocated in the data region for the payload transmission and associated with payload data occupying further resources allocated in the data region for the payload transmission The above table illustrates embodiments in accordance with which two $2^{nd}$ stage SCIs are employed. However, the present invention is not limited to such embodiments. In accordance with further embodiments, three or more $2^{nd}$ stage SCIs of Type 1, Type 2 or Type 3 may be provided in the data region of the transmission. Some embodiments from the above table are now described in more detail.

Figure 7:
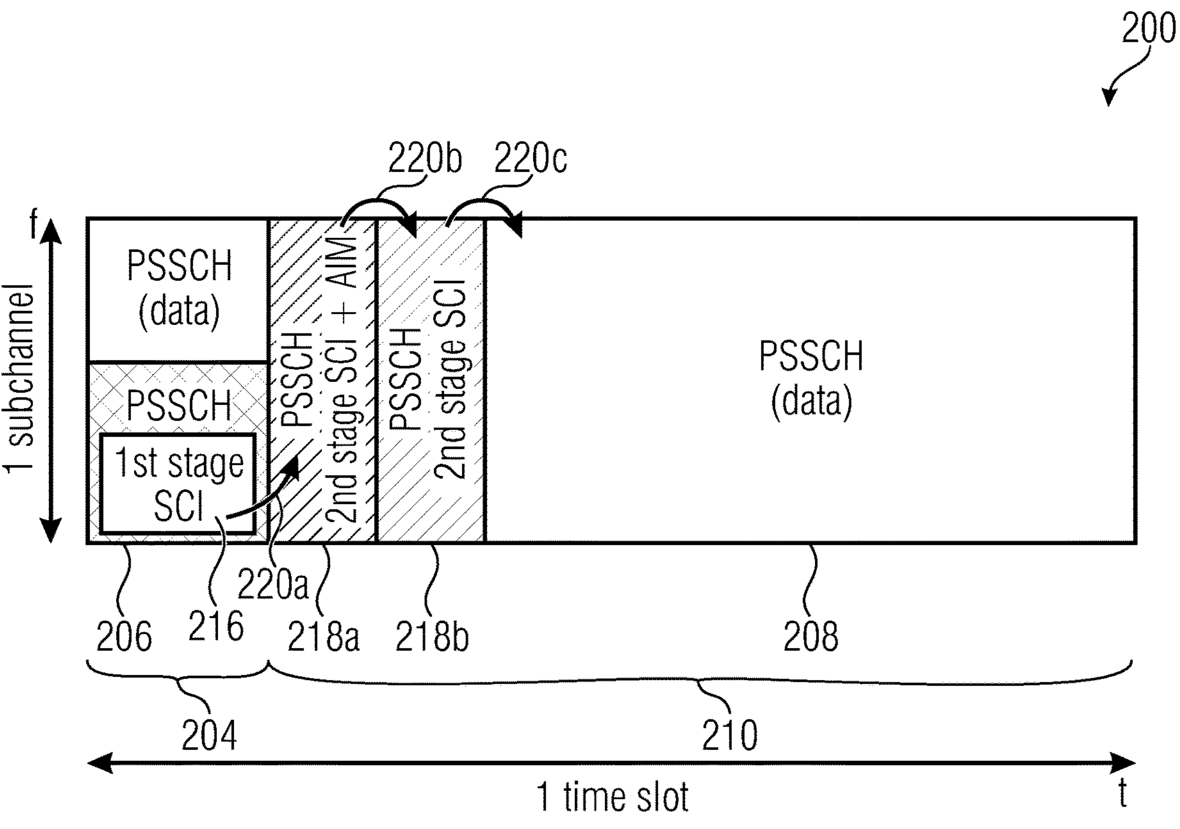
FIG. 7 illustrates a transmission including in a PSSCH a first $2^{nd}$ stage SCI including the additional control information, like an AIM, and a second, conventional $2^{nd}$ stage SCI associated with data in accordance with an embodiment of the second aspect of the present invention.

In accordance with another embodiment, a transmission may include a $2^{nd}$ stage SCI including the additional control information, like an AIM, and a conventional $2^{nd}$ stage SCI associated with data in a PSSCH. FIG. 7 illustrates such an embodiment, more specifically a transmission 200 including the control region or PSCCH 216 and the data region or PSSCH 208. A $1^{st}$ stage SCI or a first control message 216 is included in the control region 206, while the data region 218 includes a first $2^{nd}$ stage SCI 218*a* and a second $2^{nd}$ stage SCI 218*b*. As is indicated at 220*a*, the $1^{st}$ stage SCI 216 points to the first $2^{nd}$ stage SCI 218*a* which includes the control information or AIM. As is further indicated by 220*b*, the first $2^{nd}$ stage SCI not only includes the AIM but also points to the second $2^{nd}$ stage SCI 218*b* which, in turn, as is indicated at 220*c*, points to the payload data contained in the remaining part of the data region 208. Thus, the $1^{st}$ stage SCI 216 may use a $2^{nd}$ stage SCI format indicator to indicate 220*a* the $2^{nd}$ stage SCI format 218*a* including the AIM. The $2^{nd}$ stage SCI format 218*a* includes the AIM as well as a further parameter indicating the presence of the second $2^{nd}$ stage SCI format 218*b* which may be linked to a payload data included in the rest of the PSSCH resources allocated for the transmission 200, as well as information required by the UE to decode the data payload, such as HARQ-related information.

In accordance with other embodiments, the second $2^{nd}$ stage SCI 218*b* may be associated with and points to control data, like the AIM(s), that occupies resources allocated to payload data. In other words, the above mentioned payload data associated with the second $2^{nd}$ stage SCI may actually be control information or an AIM.

The first $2^{nd}$ stage SCI format 218*a* may include one or more AIMs that are smaller in size when compared to an AIM as described above with reference to the first aspect of the present invention. In accordance with embodiments, the $2^{nd}$ stage SCI 218*a* including the AIM may be used in case the AIM does not include sensing results but a candidate resource set or exact resources to be used by a receiving UE for a transmission. This, in accordance with embodiments, is advantageous for unicast transmissions when a first UE, like a transmitting or TX UE, transmits the unicast data to a second UE, the RX UE and also provides resources to be used by the second UE for a transmission back to the first UE, in response to the initial unicast transmission.

In accordance with embodiments, a $2^{nd}$ stage SCI including the AIM may include an additional parameter pointing to the presence of a further $2^{nd}$ stage SCI format in the data region or PSSCH 208. In case the control information included in the first second $2^{nd}$ SCI 280*a* is an AIM containing resource locations, they may be indicated in the same way as described above with reference to the first aspect of the present invention.

In accordance with further embodiments of the second aspect of the present invention, a transmission may include a plurality of $2^{nd}$ stage SCIs one or more of which are SCIs in accordance with the first aspect of the present invention. Thus, in accordance with embodiments the entirety of the PSSCH or all of the resources allocated in the PSSCH to the payload may be occupied by respective $2^{nd}$ stage SCIs including the additional control information or AIMs.

Figure 8A:
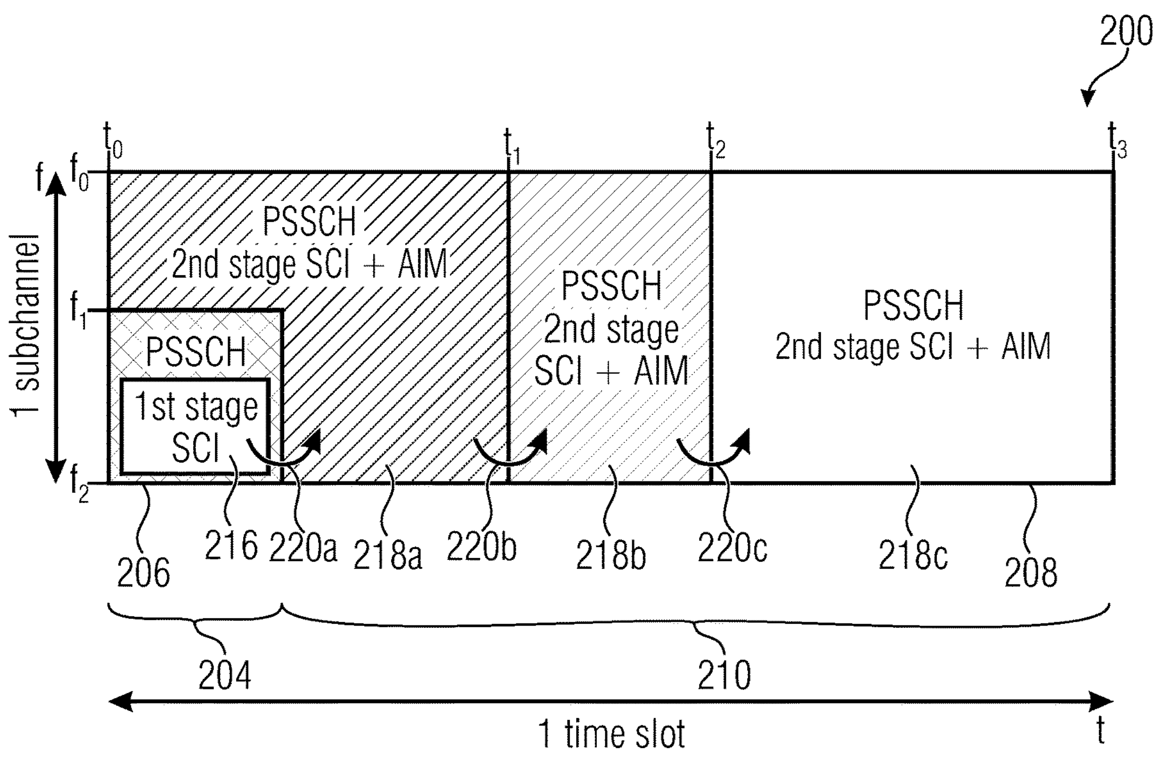
FIGS. 8(*a*) and 8(*b*) illustrate an embodiment of the second aspect of the present invention including a plurality of $2^{nd}$ stage SCIs each of which includes control information or one or more AIMs such that an entire PSSCH or data region is occupied by the plurality of $2^{nd}$ stage SCIs.
Figure 8B:
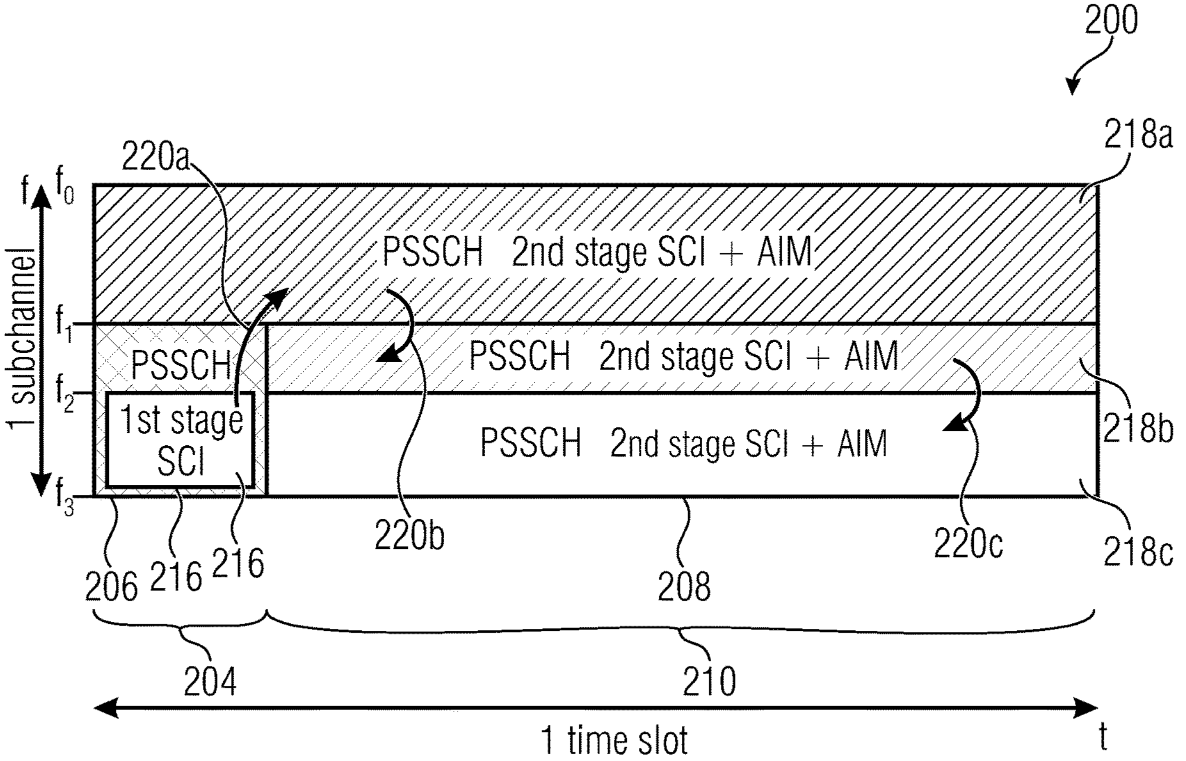

FIG. 8 illustrates an embodiment of the second aspect of the present invention including a plurality of $2^{nd}$ stage SCIs each of which includes control information or one or more AIMs such that the entire PSSCH or data region is occupied by the plurality of $2^{nd}$ stage SCIs. FIG. 8(*a*) illustrates an embodiment in which the plurality of $2^{nd}$ stage SCIs are distributed over the time domain, while FIG. 8(*b*) illustrates an embodiment in accordance with which the plurality of $2^{nd}$ stage SCIs is distributed over the frequency domain.

As is illustrated in FIG. 8(*a*), the transmission 200 includes the control region or PSCCH 206 and the data region or PSSCH 208. The control region includes the $1^{st}$ stage SCI 216, and all resources of the data region or PSSCH are occupied by respective $2^{nd}$ stage SCIs. In the embodiment of FIG. 8, a first $2^{nd}$ stage SCI 218*a*, a second $2^{nd}$ stage SCI 218*b* and a third $2^{nd}$ stage SCI 218*c* are illustrated, although, in accordance with other embodiments, only two second $2^{nd}$ stage SCIs or more than the illustrated three second $2^{nd}$ stage SCIs may be employed. Each of the $2^{nd}$ stage SCIs includes control information, like an AIM so that the transmission 200, other than a conventional transmission, does not include any payload data for a receiving or RX UE but only the additional control information or AIM provided by the respective $2^{nd}$ stage SCIs. In the embodiment of FIG. 8(*a*), the first $2^{nd}$ stage SCI starts at the beginning t0 of the transmission 200 extends in the time domain until t1, at which the second $2^{nd}$ stage SCI 218*b* starts. The second $2^{nd}$ stage SCI terminates at t2, at which the third $2^{nd}$ stage SCI 218*c* starts that ends at t3, the end of transmission 200. In the frequency domain, the $2^{nd}$ stage SCIs extend over the entire sub channel, except for the first second $2^{nd}$ stage SCI, a first part of which only extends over an upper part of the sub channel, namely in the region of the symbols 204 and the lower part of the sub channel in these symbols is occupied by the control region 206.

FIG. 8(*b*) shows a similar structure as FIG. 8(*a*) except that the respective $2^{nd}$ stage SCIs are arranged along the frequency domain and extend over the entire length of the time slot, except for the second and third $2^{nd}$ stage SCIs 218*b* and 218*c* that only use symbols 210 because symbols 204 are occupied by the control region. The first $2^{nd}$ stage SCI 218*a* starts at an upper boundary f0 of the sub channel and extends to the frequency f1. The second $2^{nd}$ stage SCI extends between the frequency f1 and a further frequency f2, and the third $2^{nd}$ stage SCI extends from frequency f2 to frequency f3, the end or lower boundary of the sub channel of the transmission 200.

As is illustrated in FIG. 8, the $1^{st}$ stage SCI points 220*a* to the first $2^{nd}$ stage SCI, which, in turn, points 220*b* to the second $2^{nd}$ stage SCI, which, in turn, points to the third $2^{nd}$ stage SCI 218*c*, as is indicated at 220*c*. Thus, the respective $2^{nd}$ stage SCIs point to each other in a chain-like manner. For this, each of the $2^{nd}$ stage SCIs includes a parameter to indicate the presence of a further $2^{nd}$ stage SCI format so that a receiving UE that receives the transmission 200 is aware of the presence of the plurality of $2^{nd}$ stage SCIs.

In accordance with embodiments, the respective $2^{nd}$ stage SCIs include one or more respective AIMs that may pertain to different resource pools for the receiving UE or to different priorities within a given resource pool. The AIMs may also pertain to different cast types, such as unicast, groupcast or broadcast transmissions. In accordance with such embodiments, the $2^{nd}$ stage SCI may contain parameters indicating the resource pool ID to which an AIM is relevant to or the priority or cast type for which the AIM may be used.

Also in this embodiment, the plurality of $2^{nd}$ stage SCIs may be meant for a single receiving UE or for a plurality of receiving UEs. In accordance with embodiments, the differentiation may be made by providing one or more destination IDs or one or more group IDs in each of the respective $2^{nd}$ stage SCIs 218*a* to 218*b* as described above.

In accordance with embodiments, the $1^{st}$ stage SCI 216 includes a $2^{nd}$ stage SCI format indicator that points to a single one of the $2^{nd}$ stage SCIs, in the embodiment of FIG. 8, to the first $2^{nd}$ stage SCI 218*a*. In accordance with embodiments, the $2^{nd}$ stage SCI format indicator included in the $1^{st}$ stage SCI 206 may include a predefined or configured value for informing the receiving UE that the transmission 200 not only includes the $2^{nd}$ stage SCI but actually a plurality of such $2^{nd}$ stage SCIs. Thus, in accordance with embodiments, the $2^{nd}$ stage SCIs 218*a* to 218*c* may be provided with a new parameter pointing to the presence of another $2^{nd}$ stage SCI located in the data region or PSSCH 208. Also, a destination ID field may be provided in one or more of the $2^{nd}$ stage SCIs 218*a* to 218*c* so as to include a single or a plurality IDs or a single or a plurality of group IDs. In accordance with embodiments, the respective $2^{nd}$ stage SCIs may also include a parameter identifying a resource pool ID for which an AIM is meant and/or a priority of resources indicated in the AIM and/or a cast type for which the resources indicated in the AIM are relevant.

Figure 9A:
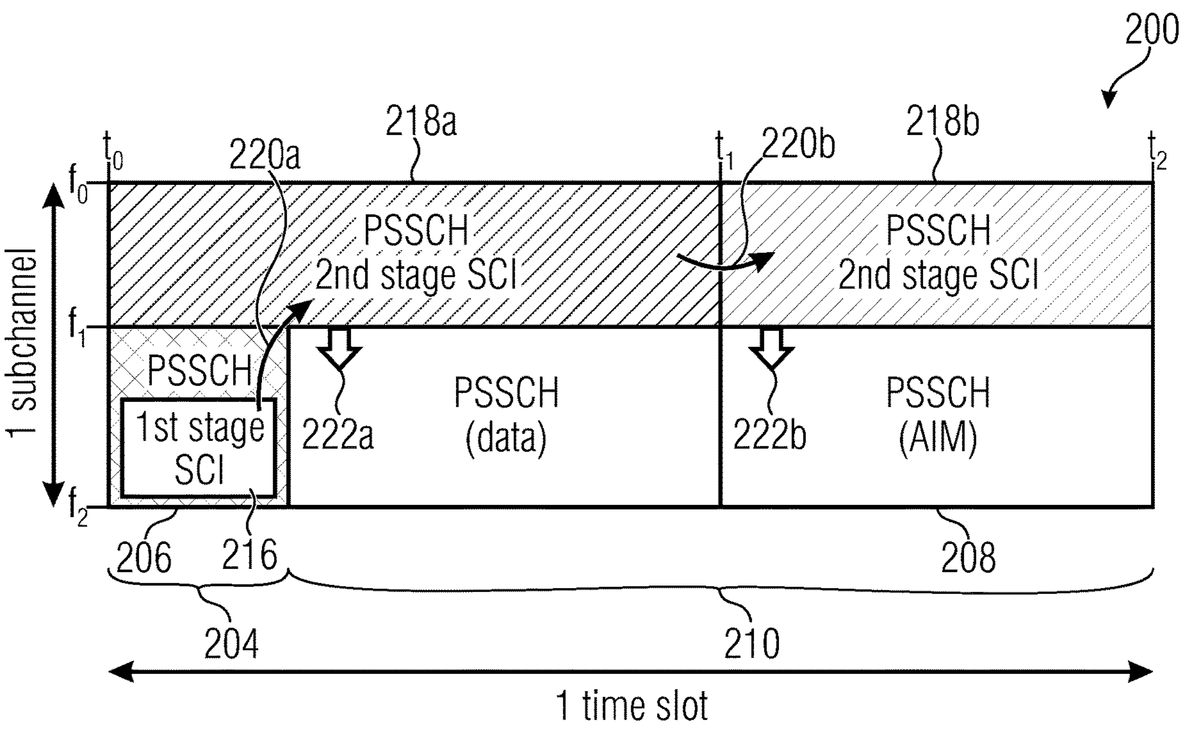
FIGS. 9(*a*) and 9(*b*) illustrate an embodiment of the second aspect of the present invention including a plurality of $2^{nd}$ stage SCIs, one including control information or one or more AIMs and one being associated with control information or one or more AIMs stored in the PSSCH, such that an entire PSSCH or data region is occupied by the plurality of $2^{nd}$ stage SCIs.
Figure 9B:
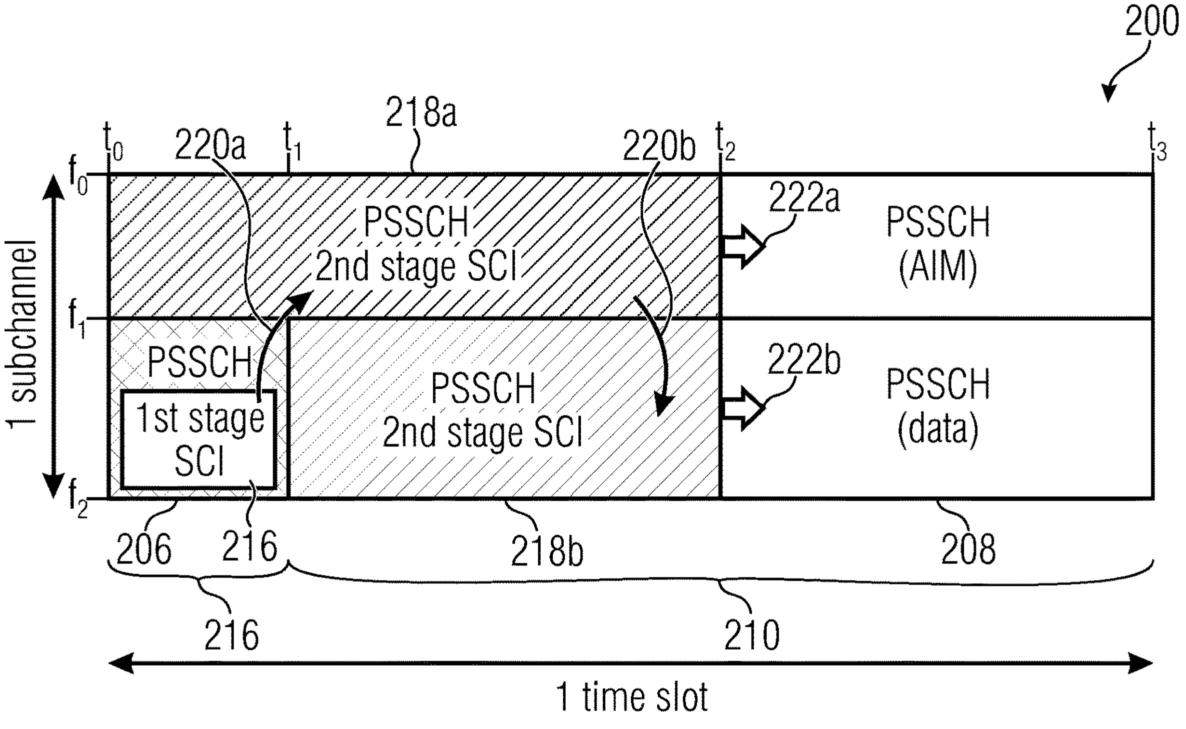

FIG. 9 illustrates a further embodiment of the second aspect of the present invention in accordance with which a plurality of $2^{nd}$ stage SCIs are employed which are associated with respective data packets provided in the PSSCH which may be either payload data or additional control information, like an AIM. FIG. 9(*a*) illustrates an embodiment in accordance with which the respective plurality of $2^{nd}$ stage SCIs are arranged along the time domain, while FIG. 9(*b*) shows an embodiment in which the additional $2^{nd}$ stage SCIs are arranged along the frequency domain.

In FIG. 9(*a*), the transmission 200 is illustrated including the control region or PSCCH 206 including the $1^{st}$ stage SCI 216. The data region or PSSCH 208 includes the first $2^{nd}$ stage SCI 218*a* extending from the start of the transmission 200 at t0 to a time t1 at which a second $2^{nd}$ stage SCI 218*b* starts that ends at t2, which is the end of the transmission 200. In the embodiment of FIG. 9(*a*), the $2^{nd}$ stage SCIs span only a subsection of the sub channel from frequency f0 to frequency f1, while the frequency range from f1 to f2, the lower part of the sub channel, carries data, either payload data as indicated at 222*a* or control data like an AIM, as indicated at 222*b*. The $1^{st}$ stage SCI 216*a* points 220*a* to the first $2^{nd}$ stage SCI 218*a* which, in turn, points 220*b* to the second $2^{nd}$ stage SCI.

FIG. 9(*b*) shows a similar arrangement except that the second $2^{nd}$ stage SCIs are arranged along the frequency domain so that the first $2^{nd}$ stage SCI starts at a frequency f0 and extends along the frequency domain until frequency f1, and the second $2^{nd}$ stage SCI starts at f1 and ends at f2 which is the lower end of the sub channel of the transmission 200. The respective second $2^{nd}$ stage SCIs start at a time t0 and t1, respectively, and end a time t2, and the remainder of the data region or PSSCH holds payload data or control data, like AIM. Thus, in the embodiment described with reference to FIG. 9, a plurality of $2^{nd}$ stage SCIs 218*a* and 218*b* having associated data packets outside the SCIs are transmitted in the PSSCH 208. The data packets associated with the $2^{nd}$ stage SCIs may contain data or AIMs, as explained above, and the $2^{nd}$ stage SCIs 218*a* and 218*b* may include a parameter for the receiving UE so as to let it know whether the associated data contains an AIM or a data packet, i.e. payload.

As also described in the preceding embodiments, also in this embodiment, each of the $2^{nd}$ stage SCIs may include one or more destination IDs for indicating UEs for which the information is meant, i.e., a single destination ID or a plurality of destination IDs may be included. Likewise, also one or more groups may be indicated by using respective group IDs.

As described above, also in this embodiment, the first $2^{nd}$ stage SCI indicates the next $2^{nd}$ stage SCI, and the $1^{st}$ stage SCI may include the above-described information for informing the UE about the presence of a plurality of second $2^{nd}$ stage SCIs.

The second $2^{nd}$ stage SCIs, in accordance with the present embodiment, may include a parameter indicating the content of the associated data, whether it is control data, like an AIM, or payload, like a data packet. The $2^{nd}$ stage SCIs may include a parameter pointing to the presence of a further $2^{nd}$ stage SCI in the data region. The $2^{nd}$ stage SCIs may include a destination ID field allowing to include one or more UE IDs or one or more group IDs. Also, in accordance with further embodiments, a resource pool ID may be included for which the control data or AIM is relevant, as well as a priority of resources indicated in an AIM may be signaled, and/or a cast type for which the resources indicated in the AIM are relevant.

With reference to FIG. 7 to FIG. 9, some embodiments using a plurality of $2^{nd}$ stage SCIs have been described, however, the inventive approach is not limited to such approaches, rather any combination of $2^{nd}$ stage SCIs is possible, like the ones described in the above table. In case the control information associated with a $2^{nd}$ stage SCI includes an AIM indicating resource locations, they may be indicated in a way as described above with reference to FIG. 5.

In accordance with embodiments of the second aspect of the present invention, a UE receiving a transmission including a plurality of $2^{nd}$ stage SCIs may differentiate the respective $2^{nd}$ stage SCIs and, if present, the associated data transmissions to be decoded by the receiving UE and transported in the PSSCH in one of the following ways:

(a) Header Differentiation

The receiving UE may decode one or more MAC elements, like a MAC PDU containing one or more MAC control elements, CEs, or a MAC header, so as to determine the symbols that are relevant for the receiving UE, and based on the information, the receiving UE is able to differentiate between symbols associated with the different AIMs.

(b) Destination ID Differentiation

The CRC of the control data or payload data included in or associated with each of the $2^{nd}$ stage SCIs may be scrambled with the destination IDs of the intended receiving UEs. Thus, a receiving UE may attempt to blindly decode the PSSCH containing the plurality of $2^{nd}$ stage SCIs and only successfully decodes those portions, namely symbols across time and RBs across frequency, of the PSSCH that is relevant for the receiving UE. In case the information is relevant for a group of UEs, the CRC of the control data or payload data may be scrambled with a group cast ID.

(c) Transmission Map Differentiation

In the wireless communication network, the respective UEs may be configured or pre-configured with the map of a PSSCH or the data region of a transmission so as to indicate to the respective receiving UEs which symbols and RBs are relevant or are associated with the respective UEs. Thus, when having knowledge of such a map, the UE knows which part of the PSSCH holds information relevant for the UE and only these parts may be decoded.

In accordance with embodiments, the UE is configured or pre-configured with the transmission map or with a transmission map identification, ID, at one or more of the following:

- a system level, e.g., by the network, a gNB, a SIM-card, or is hard-coded in the UE,
- a resource pool level, e.g. in the resource pool configuration,
- a transmission level, e.g. in a control message, like a first DCI or a $1^{st}$ stage SCI, for the transmission of the transmission,
- a source level, e.g., one or more maps are configured by the source network entity sending the transmission and may vary between different network entities. For example, the transmission map is not globally fixed but signaled on a per source basis so that different sources may use different maps. This may be used to optimize the transmission map, e.g., based on the number of receivers, type of transmissions and receiver capabilities.

In accordance with embodiments, the map may divide the symbols and RBs into different regions, similar to search spaces within a CORESET, and each of the regions or parts of the PSSCH may be assigned a region ID or a search space ID. The $2^{nd}$ stage SCIs are then transmitted using these regions, and the respective regions or region ID or search space ID may be configured or preconfigured for the RX UE in the above-described ways, namely on a system level, on a resource pool level, on a source level, or on a transmission level.

A receiving UE that receives or has knowledge of a transmission map is aware that within a PSSCH of the transmission, certain symbols across time and certain RBs across frequency, which may correspond to a given resource ID, are meant for the given UE so that the UE decodes only these parts of the PSSCH.

In accordance with another embodiment, the UE may blindly decode the $2^{nd}$ stage SCIs that are within its preconfigured or configured region in order to detect whether associated control or payload data is meant for the UE, e.g. by matching the destination ID in the $2^{nd}$ stage SCIs. Responsive to identifying a transmission for itself, the UE attempts to decode the associated control or payload data.

The $2^{nd}$ stage SCIs may vary in size, and therefore, in accordance with embodiments, a PSSCH configuration may include either a plurality of $2^{nd}$ SCIs of the same size or a plurality of $2^{nd}$ stages of varying sizes so that, accordingly, also the size of the respective regions within a map may vary. Therefore, in accordance with embodiments, a plurality of transmission maps may be configured or preconfigured for each of the receiving UEs, for example, using a map index or map ID to be indicated to the receiving UE by a system level configuration, by a resource pool level configuration or by a transmission level configuration as explained above.

In accordance with further embodiments, different aggregation levels may be employed for the $2^{nd}$ stage SCIs dependent on the content of the AIM or dependent on required code rates or dependent on the channel conditions prevalent between the UE and the intended receiver UEs. For example, an AIM containing sensing reports may use a plurality of resources and a high aggregation level, while a candidate resource set is smaller and may use lower aggregation levels.

General Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

In accordance with embodiments of the first and second aspects of the present invention, in addition to the parameters already mentioned in the description of the above embodiments, the $2^{nd}$ stage SCI may include one or more of the following additional information:

- a $2^{nd}$ stage SCI index ID so that, for example, a first $2^{nd}$ stage SCI has a first index ID, a second $2^{nd}$ stage SCI has a second index ID and so on,
- type of AIM: an indication of whether the AIM includes sensing results, candidate resource sets or exact resources,
- the cast type that the AIM is relevant for: namely whether it is a unicast, groupcast or broadcast,
- a duration for which the control data is valid, like an expiry timer.
- a destination ID (as described above),
- a resource pool ID within which the control data is relevant,
- a priority associated with the control data,
- an indication that the associated transmission in the data region contains control data, or payload data, or both,
- a time resource indicator value,
- a frequency resource indicator value.

In accordance with further embodiments of the first and second aspects of the present invention, the $1^{st}$ stage SCI may use one or more of the still available reserve bits to indicate one or more of the following:

a portion of the destination ID so as to allow a receiving UE, i.e., a UE receiving the transmission, to determine whether the transmission is actually relevant for the UE or not by only decoding the 1$^{st}$ stage SCI so as to allow a UE to avoid unnecessary decoding of the PSSCH when determining on the basis of the decoded part of the destination ID contained in the 1$^{st}$ stage SCI that the transmission is not intended for or directed to the receiving UE, a number of 2$^{nd}$ stage SCIs so as to inform the receiving UE of the number of 2$^{nd}$ stage SCIs associated with the 1$^{st}$ stage SCI, a transmission map index so as to inform the receiving UE, when being configured or preconfigured with a set of transmission maps, which map to refer to for successfully decoding 2$^{nd}$ stage SCIs and accompanying data, if any, being relevant for the receiving UE, a multi 2$^{nd}$ stage SCI format indicator by reusing an existing 2$^{nd}$ stage SCI format indicator with additional bits to indicate the different additional 2$^{nd}$ stage SCI formats or to indicate by default value the presence of a plurality of 2$^{nd}$ stage SCI formats, a transmission map or a transmission map ID so as to indicate the above-described transmission map for a following PSSCH to the receiving UE in the 1$^{st}$ stage SCI directly or, when using the transmission map ID allowing the UE to select one of the configured or preconfigured transmission maps to be used for decoding information from the following PSSCH, a search region ID or a search space ID informing the UE about specific symbols and RBs within a transmission map of a PSSCH the UE is to decode, a slot sharing indicator indicating that the PSSCH resources are shared among a plurality of sending UEs, so as to indicate, for example, the occupancy/number of symbols meant to be used by a first transmitting UE or any further transmitting UE.

In accordance with further embodiments, the above-mentioned parameters may also be included in a yet further 2$^{nd}$ stage SCI, that may be referred to as a pre-2$^{nd}$ stage SCI received after the 1$^{st}$ stage SCI and ahead of the regular 2$^{nd}$ stage SCI so as to allow successfully decoding the regular 2$^{nd}$ stage SCIs.

In accordance with further embodiments of the present invention, the above-mentioned destination ID may be used by a receiving UE to determine whether a transmission is meant for the receiving UE or not. The destination ID may also include one or more group IDs, and a receiving UE may consider the transmission to be meant for it when the receiving UE is part of this group. In accordance with further embodiments, the group ID may be mapped to certain use cases. For example, group ID may be assigned to all UEs that are expected to receive data or AIMs regarding certain whether conditions, like an early tsunami warning. Another group ID may be assigned to all urban UEs traveling within congested city roads. The group ID to use case mapping may be configured or preconfigured system-wide. For example, the UE may be configured, preconfigured or hardcoded to receive transmission pertaining to certain group IDs so as to enable any UE to selectively receive any group message that it has been configured to receive.

In the above-described embodiments of the present invention, reference has been made to a transmission extending over one time slot, however, it is noted that the inventive approach is not limited to such a structure, i.e., it is not restricted to a single time slot, rather, it is equally applicable to any configuration in which the transmission extends over a plurality of time slots.

In the above-described embodiments of the present invention, reference has been made to a transmission over a sidelink using respective 1$^{st}$ and 2$^{nd}$ stage SCIs, however, it is noted that the inventive approach is not limited to such transmissions. In accordance with further embodiments, the transmission may be from one or more radio access networks, RANs, entities of the wireless communication system, like one or more base stations, using a radio interface, like a Uu interface, and including 1$^{st}$ and 2$^{nd}$ stage control messages, like DCIs, MAC CEs or RRC signaling. In this case, the 1$^{st}$ stage control messages may be sent over the PDCCH or PDSCH, e.g. using DCI, MAC CE or RRC signaling, the 1$^{st}$ stage control message pointing to a resource allocation, e.g. PDSCH or PUSCH, including one or more 2$^{nd}$ stage control messages, like DCIs. In accordance with a further embodiment, responsive to a detection of a 1$^{st}$ stage control message, the 2$^{nd}$ stage control messages may be blind decoded by the UE to determine whether associated control or payload data is meant for the UE.

Although some of the embodiments above are described with reference to a Mode 2 UE, it is noted that the present invention is not limited to such embodiments. The teachings of the present invention as descried herein are equally applicable to Mode 1 UEs carrying out sensing to obtain, e.g., a sensing report for providing an occupancy status of one or more resources or resource sets.

Although some of the embodiments above are described with reference to a sidelink pool, it is noted that the present invention is not limited to such embodiments. Rather, the inventive approach may be implemented in a system or network providing a set or resources to be used for a certain communication between entities in the network, and the set of resources may be preconfigured so that the entities of the network are aware of the set of resources provided by the network, or the entities may be configured by the network with the set of resources. The set of resources provided by the network may be defined as one or more of the following:

a sidelink resource pool, to be used by the UE for sidelink communications, e.g. direct UE-to-UE communication via PC5, a configured grant including or consisting of resources to be used by the UE for NR-U communications, a configured grant including or consisting of resources to be used a reduced capability UE.

In accordance with embodiments, the wireless communication system may include a terrestrial network, or a non-terrestrial network, or networks or segments of networks using as a receiver an airborne vehicle or a space-borne vehicle, or a combination thereof.

In accordance with embodiments of the present invention, the UE and/or the further UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a base station e.g. gNB, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a transceiver, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 10:
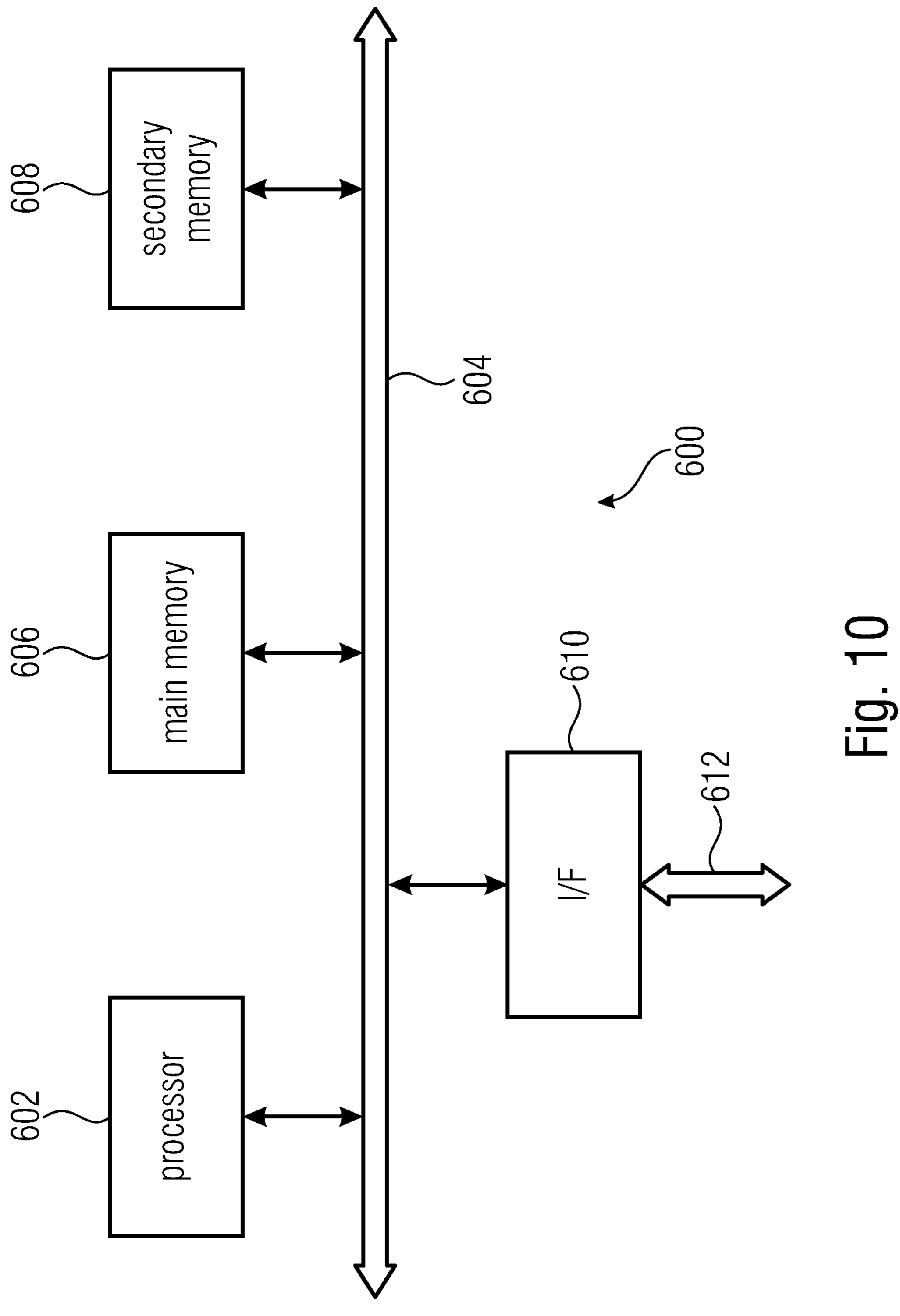
FIG. 10 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device, UE, for a wireless communication network, comprising:

at least one antenna or at least one antenna array having a plurality of antenna elements;

a signal processor; and a transceiver, wherein the UE is to communicate with one or more network entities of the wireless communication network, like a base station or another UE, wherein the UE is to receive from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the second control message occupies some of resources allocated in the data region of the transmission and includes inter-UE coordination information and information to identify and decode data in the data region, or occupies all of the resources allocated in the data region of the transmission and includes only inter-UE coordination information, or occupies some of the resources allocated in the data region of the transmission and includes information to identify and decode inter-UE coordination information included in the data region of the transmission, and wherein the inter-UE coordination information provide assistance in a form of a set of resources to be available or non-available for use by the UE.

2. The user device, UE, of claim 1, wherein the inter-UE coordination information comprises control information useful to the UE, the inter-UE coordination information being transmitted in the data region and being different from any payload to be transmitted in the data region.

3. The user device, UE, of claim 1, wherein the first control message includes a parameter indicating a format of the second control message present in the data region, the parameter indicating that the second control message includes the inter-UE coordination information and occupies all of the resources allocated in the data region of the transmission, and responsive to the parameter, the UE is not to expect receiving any payload data in the data region but the only inter-UE coordination information, like an assistance information message, AIM.

4. The user device, UE, of claim 3, wherein the second control message includes one or more destination identifications, IDs, indicating one or more UEs to which the inter-UE coordination information in the data region of the transmission is directed, or one or more group IDs indicating one or more groups of UEs to which the inter-UE coordination information in the data region of the transmission is directed, and the UE is to decode the inter-UE coordination information from the data region of the transmission in case the second control message includes a destination ID that matches an ID of the UE or a group ID of a group of which the UE is a member.

5. The user device, UE, of claim 4, wherein the first control message includes a portion of a destination ID or a group ID, and the UE is to determine the transmission to be relevant to the UE from the decoded first control message when the portion of the destination ID or the group ID is associated with an ID of the UE.

6. The user device, UE, of claim 1, wherein the first control message includes a parameter indicating a format of the second control message present in the data region, the parameter indicating that the second control message is associated with the inter-UE coordination information included in at least a part of the data region of the transmission, the second control message includes information to be used for decoding the inter-UE coordination information present in the data region, and responsive to the parameter, the UE is not to expect receiving any payload data in some or all of the data region but the only inter-UE coordination information, like an AIM, and is to use the information from the second control message for decoding the inter-UE coordination information present in the data region.

7. The user device, UE, of claim 1, wherein the inter-UE coordination information in the transmission includes one or more reports or assistance information messages, AIMs, including resource allocation related assistance information, wherein, responsive to a trigger for a transmission, the UE is to determine a candidate resource set for the transmission by selecting resources for the transmission within a selection window following the trigger, wherein the UE is to select the resources by taking into consideration sensing results obtained by the UE during a sensing window preceding the trigger, the sensing results indicating whether certain resources are available or unavailable for the transmission, and wherein the UE considers a received report or AIM, like an AIM including sensing results, for selecting resources for the transmission.

8. A wireless communication system, comprising:

a plurality of user devices, UEs, configured for a sidelink communication using, for example resources from a set of sidelink resources of the wireless communication system, wherein the plurality of UEs comprises one or more UEs of claim 1, and wherein the plurality of UEs comprises one or more of further UEs.

9. A user device, UE, for a wireless communication network, comprising:

at least one antenna or at least one antenna array having a plurality of antenna elements;

a signal processor; and a transceiver, wherein the UE is to communicate with one or more network entities of the wireless communication network, like a base station or another UE, wherein the UE is to receive from a network entity a transmission, the transmission including a control region, like a Physical Sidelink Control Channel, PSCCH, and a data region, like a Physical Sidelink Shared Channel, PSSCH, wherein the transmission includes a first control message, like a 1$^{st}$-stage SCI, in the control region, and a second control message, like a 2$^{nd}$-stage SCI, in the data region, wherein the transmission includes at least one further second control message, like a further 2$^{nd}$-stage SCI, in the data region, wherein the at least one further second control message occupies some of resources allocated in the data region of the transmission and only includes inter-UE coordination information, or occupies some of the resources allocated in the data region of the transmission and includes information to identify and decode inter-UE coordination information included in the data region of the transmission, and wherein the inter-UE coordination information provide assistance in a form of a set of resources to be available or non-available for use by the UE.

10. The user device, UE, of claim 9, wherein the first control message includes a parameter pointing to the second control message, and wherein the second control message includes a parameter pointing to one of the at least one further second control message.

11. The user device, UE, of claim 9, wherein the second control message includes inter-UE coordination information and occupies some of the resources allocated in the data region of the transmission, or is associated with inter-UE coordination information included in at least a part of the data region of the transmission, or is associated with payload data included in at least a part of the data region of the transmission.

12. The user device, UE, of claim 9, wherein the first control message indicates a number of second control messages in the transmission associated with the first control message, and/or includes a multi-second control message format indicator indicating a presence of and/or formats of the second control message.

13. The user device, UE, of claim 9, wherein the transmission comprises one or more MAC elements, like a MAC PDU or a MAC header, indicating one or more UEs or one or more groups of UEs to which the inter-UE coordination information in the data region of the transmission is directed, and the UE is to decode from the data region of the transmission the inter-UE coordination information indicated by the MAC header to be directed to the UE.

14. The user device, UE, of claim 9, wherein a CRC of the second control message and/or a further second control message is scrambled with one or more destination identifications, IDs, indicating one or more UEs to which the inter-UE coordination information in the data region of the transmission is directed, or one or more group IDs indicating one or more groups of UEs to which the inter-UE coordination information in the data region of the transmission is directed, and/or the UE is to blindly decode the data region to obtain the inter-UE coordination information from the data region of the transmission that is relevant for the UE.

15. The user device, UE, of claim 9, wherein the UE is configured or pre-configured with at least one transmission map for the data region of the transmission, the at least one transmission map indicating a plurality of parts of the data region, each part associated with one or more UEs or one or more groups of UEs to which the inter-UE coordination information in that part of the data region of the transmission is processed, and the UE is to attempt to decode parts of the data region of the transmission associated with the UE.

16. The user device, UE, of claim 9, wherein the second control message and/or a further second control message use one or more first aggregation levels being different from a second aggregation level used by a second control message, the one or more first aggregation levels being same or different dependent on a nature of control messages or channel conditions between a source network entity sending the transmission and the UE.

17. The user device, UE, of claim 9, wherein the second control message and each further second control message include at least one following parameter:

an index ID, a type of the inter-UE coordination information, a cast type for which the inter-UE coordination information is relevant, a duration for which the inter-UE coordination information is valid, like an expiry timer, a destination ID, a resource pool ID within which the inter-UE coordination information is relevant, a priority associated with the inter-UE coordination information, an indication that the transmission in the data region contains the inter-UE coordination information, or payload data, or both, a time resource indicator value, a frequency resource indicator value, a zone ID indicating a geographical location or any other reference to a location of the UE, a minimum communication range within which the UE needs to be with respect to a source network entity.

18. A method for operating a user device, UE, of a wireless communication network, the UE communicating with one or more network entities of the wireless communication network, like a base station or another UE, the method comprising:

receiving from a network entity a transmission, the transmission including a control region, like a Physical Sidelink Control Channel, PSCCH, and a data region, like a Physical Sidelink Shared Channel, PSSCH, wherein the transmission includes a first control message, like a 1$^{st}$-stage SCI, in the control region, and a second control message, like a 2$^{nd}$-stage SCI, in the data region, and wherein the second control message occupies some of resources allocated in the data region of the transmission and includes inter-UE coordination information and information to identify and decode data in the data region, or occupies all of the resources allocated in the data region of the transmission and includes only inter-UE coordination information, or occupies some of the resources allocated in the data region of the transmission and includes information to identify and decode inter-UE coordination information included in the data region of the transmission, and wherein the inter-UE coordination information provide assistance in a form of a set of resources to be available or non-available for use by the UE.

19. A method for operating a user device, UE, of a wireless communication network, the UE communicating with one or more network entities of the wireless communication network, like a base station or another UE, the method comprising:

receiving from a network entity a transmission, the transmission including a control region, like a Physical Sidelink Control Channel, PSCCH, and a data region, like a Physical Sidelink Shared Channel, PSSCH, wherein the transmission includes a first control message, like a $1^{st}$-stage SCI, in the control region, and a second control message, like a $2^{nd}$-stage SCI, in the data region, and wherein the transmission includes at least one further second control message, like a further $2^{nd}$-stage SCI, in the data region, wherein the at least one further second control message occupies some of resources allocated in the data region of the transmission and only includes inter-UE coordination information, or occupies some of the resources allocated in the data region of the transmission and includes information to identify and decode inter-UE coordination information included in the data region of the transmission, and wherein the inter-UE coordination information provide assistance in a form of a set of resources to be available or non-available for use by the UE.

* * * * *